United States Patent
Mokheimer et al.

(10) Patent No.: US 11,480,160 B1
(45) Date of Patent: Oct. 25, 2022

(54) HYBRID SOLAR-GEOTHERMAL POWER GENERATION SYSTEM

(71) Applicants: KING FAHD UNIVERSITY OF PETROLEUM AND MINERALS, Dhahran (SA); King Abdullah City for Atomic & Renewable Energy (K.A.CARE), Riyadh (SA)

(72) Inventors: Esmail M. A. Mokheimer, Dhahran (SA); Mohammad Raghib Shakeel, Dhahran (SA)

(73) Assignees: KING FAHD UNIVERSITY OF PETROLEUM AND MINERALS, Dhahran (SA); King Abdullah City for Atomic & Renewable Energy (K.A.CARE), Riyadh (SA)

( * ) Notice: Subject to any disclaimer, the term of this patent is extended or adjusted under 35 U.S.C. 154(b) by 0 days.

(21) Appl. No.: 17/527,791

(22) Filed: Nov. 16, 2021

(51) Int. Cl.
    *F03G 4/00*     (2006.01)
    *H02K 7/18*     (2006.01)
    (Continued)

(52) U.S. Cl.
    CPC .............. *F03G 4/037* (2021.08); *F01K 23/04* (2013.01); *F01K 25/08* (2013.01); *F03G 4/035* (2021.08);
    (Continued)

(58) Field of Classification Search
    CPC .......... F03G 4/037; F03G 4/035; F03G 4/045; F03G 6/00; F03G 6/004; F03G 6/005;
    (Continued)

(56) References Cited

U.S. PATENT DOCUMENTS

| | | | |
|---|---|---|---|
| 5,970,714 A | 10/1999 | Bronicki et al. | |
| 9,085,412 B1 * | 7/2015 | Sasakura | F28D 20/0052 |

(Continued)

FOREIGN PATENT DOCUMENTS

| | | |
|---|---|---|
| CN | 103423108 B | 12/2015 |
| CN | 103423109 B | 12/2016 |

(Continued)

OTHER PUBLICATIONS

MINES ScienceDIrect Binary Cycle ; Geothermal Power Generation 2016.

(Continued)

*Primary Examiner* — Hoang M Nguyen
(74) *Attorney, Agent, or Firm* — Oblon, McClelland, Maier & Neustadt, L.L.P.

(57) ABSTRACT

A hybrid geothermal electrical power generation system that utilizes the heat from a deep geothermal reservoir to vaporize a working fluid, such as steam, $CO_2$ or an organic fluid. The vaporized working fluid is used to turn a turbine connected to an electrical power generator. A solar collector may be used to increase the temperature of the working fluid during sunlight hours and a thermal storage unit may be utilized to increase the temperature of the working fluid during the night. A supercritical $CO_2$ power generation cycle may be used alone or in combination with a steam turbine power generation cycle to utilize all of the heat energy. A vapor compression cycle, a vapor absorption cycle may be utilized to provide heating and cooling. A low temperature shallow geothermal reservoir may be used as a heat exchanger to regulate or store excess heat.

19 Claims, 17 Drawing Sheets

(51) Int. Cl.
  *F01K 23/04* (2006.01)
  *F01K 25/08* (2006.01)
  *F03G 6/00* (2006.01)
  *F24T 50/00* (2018.01)
  *F24S 23/74* (2018.01)

(52) U.S. Cl.
  CPC .............. *F03G 4/045* (2021.08); *F03G 6/00* (2013.01); *F03G 6/004* (2021.08); *F03G 6/005* (2013.01); *F24T 50/00* (2018.05); *H02K 7/1823* (2013.01); *F24S 23/74* (2018.05)

(58) Field of Classification Search
  CPC .......... F01K 23/04; F01K 25/08; F24T 50/00; H02K 7/1823; F24S 23/74
  USPC ............. 60/641.2–641.4, 641.8–641.15, 655
  See application file for complete search history.

(56) References Cited

U.S. PATENT DOCUMENTS

| | | | |
|---|---|---|---|
| 9,297,367 B2 | 3/2016 | Ramaswamy et al. | |
| 9,932,970 B1* | 4/2018 | Jeter | F03G 6/045 |
| 2006/0137349 A1* | 6/2006 | Pflanz | F28D 20/0052 |
| | | | 60/641.2 |
| 2013/0219891 A1 | 8/2013 | Schule et al. | |
| 2013/0227947 A1* | 9/2013 | Bronicki | F01K 23/04 |
| | | | 60/671 |
| 2013/0299123 A1* | 11/2013 | Matula | F24T 10/10 |
| | | | 165/45 |
| 2017/0275190 A1* | 9/2017 | Eziyi | F01K 25/08 |

FOREIGN PATENT DOCUMENTS

| | | |
|---|---|---|
| WO | 2016/098192 A1 | 6/2016 |
| WO | 2018/102265 A1 | 6/2018 |

OTHER PUBLICATIONS

Al-Nimr, et al. ; A combined CPV/T and ORC solar power generation system integrated with geothermal cooling and electrolyser/fuel cell storage unit ; Energy ; May 22, 2017.
Ahn, et al. ; Review of Supercritical CO2 Power Cycle Technology and Current Status of Research and Development ; Nucl Eng Technol 47 ; pp. 647-661 ; Jun. 6, 2015.
Siddiqui, et al. ; Energy Analysis of the S-CO2 Brayton Cycle with Improved Heat Regeneration ; MDPI processes ; Dec. 20, 2018.
Concepts NREC ; The CN300: Converting Low Temperature Heat to Electric Power ; Sep. 1, 2016.
Institut Cartografic ; What is a geothermal reservoir? Types of geothermal reservoirs ; Aug. 29, 2019 ; www.icgc.cat/en/Vitizens/Learn/Geological-resources/Geothermics/What-is-a-geothermal-reservoir-Types-of-geothermal-reservoirs.
John and Willie Leone Family Department of Energy and Mineral Engineering ; Solfar Thermal Energy for Utilities and Industry ; Absorption Cooling ; Aug. 30, 2019 ; https://www.e-education.psu.edu/eme811/node670.
Wright, et al. ; Workshop on New Cross-cutting Technologies for Nuclear Power Plants ; SuperCritical Technologies ; Jan. 30-31, 2017.
U.S. Department of Energy ; Energy Efficiency and Renewable Energy ; Nation Renewable Energy Laboratory ; Jul. 2006.
Sonal Patel ; What Are Supercritical CO2 Power Cycles? ; Apr. 1,2019

* cited by examiner

HYBRID SOLAR-GEOTHERMAL POWER GENERATION SYSTEM

BACKGROUND

Technical Field

The present disclosure is directed to hybrid solar-geothermal power generation. The present disclosure further relates to deep and shallow thermal wells utilized in thermodynamic paths to manage heat distribution to power steam, organic fluid or supercritical $CO_2$ turbines for electrical power generation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

There has been world-wide acceleration in the demand for electrical energy. For example, the demand for electricity in the Kingdom of Saudi Arabia is expected to exceed 120 GW in 2032 and is projected to consume more than 80% of the country's oil production compared to the current consumption of about 30% of oil production. This increase is due to the power needs of growing local industry, desalination and transportation sectors. Therefore, the Kingdom of Saudi Arabia has an urgent need to implement and develop the use of renewable energy. It plans to incorporate renewable sources of energy into its energy plan in order to provide a sustainable and efficient mix of energy resources. By the year 2032, an energy mix is targeted that utilizes nuclear, solar, wind, waste-energy, and geothermal on the following basis: hydrocarbons —, 60 GW, nuclear—17.6 GW, solar—41 GW of which 16 GW is planned to be generated through the use of photovoltaic cells and the balance of 25 GW by concentrated solar power, wind—9 GW, waste-to-energy—3GW and geothermal—1 GW. (See Future Energy|King Abdullah City for Atomic and Renewable Energy n.d. https://www.kacare.gov.sa/en/FutureEnergy/Pages/vision.aspx (accessed May 1, 2019); Saudi Vision 2030 n.d. https://vision2030.gov.sa/en (accessed May 1, 2019).

The steam Rankine cycle-based power generation system and the gas Brayton cycle-based power generation systems are the two most widely used systems of power generation. A considerable portion of electricity is produced using gas turbines and steam turbine cycles. However, both gas turbine cycles and steam cycles work at relatively high temperatures that may not be suitable for renewable energy sources such as solar or geothermal energy sources. As such, organic Rankine cycles (ORC) or supercritical-$CO_2$ cycles may play an important role by utilizing low temperature thermal energy from solar and geothermal sources to produce electricity. ORC uses organic, high molecular mass fluids that have a low boiling point to drive turbines. The organic fluids (ORF) can be chlorofluorocarbon (CFCs), hydrofluorocarbons (HFC) or hydrocarbons such as isobutane, pentane, propane etc. In a non-limiting example, an organic Rankine cycle turbine may be the CN300 compact, high-speed, hermetically sealed turbogenerator, which converts low temperature heat to electric power. (See The CN300: Converting Low Temperature Heat to Electric Power", Sep. 1, 2016, Concepts NREC, 217 Billings Farm Road, White River Junction, Vt., USA, https://www.conceptsnrec.com/blog/converting-low-temperature-heat-to-electric-power, incorporated herein by reference in its entirety).

Another alternative is to use supercritical carbon dioxide (S—$CO_2$). $CO_2$ is compressed in an incompressible region and later expanded at higher temperatures. $CO_2$ has a critical point at a temperature of 30.98° C. and a pressure of 7.38 MPa. (See Zhu, "Innovative power generation systems using supercritical $CO_2$ cycles", Clean Energy, Volume 1, Issue 1, December 2017, Pages 68-79, https://doi.org/10.1093/ce/zkx003; Dennis, R. "Overview of Supercritical Carbon Dioxide Based Power Cycles for Stationary Power Generation", National Energy Technology Laboratory, U.S. Dept. of Energy, Sep. 13, 2017; http://www.orc2017.com/uploads/File/Presentations/234.pdf; Zhang et al., "Investigation into Off-Design Performance of a S—$CO_2$ Turbine Based on Concentrated Solar Power", Energies 2018, 11, 3014; doi: 10.3390/en11113014; Noriega, B., "Design method for s-$CO_2$ gas turbine power plants: Integration of thermodynamic analysis and components design for advanced applications", 2012, http://resolver.tudelft.nl/uuid:e157e264-f384-4641-8293-8362fb0dc7f9, each incorporated herein by reference in its entirety).

FIG. 1A shows the S—$CO_2$ cycle. The layout is similar to that of a steam Rankine cycle or a gas Brayton cycle, but the turbine is much smaller and the cycle operates at a lower temperature. $CO_2$ is heated in the heater and applied to the turbine on pipe segment 1. Cooled gas on pipe segment 2 is further cooled in the high temperature recuperator and then applied to the low temperature recuperator along pipe segment 3. The cooled $CO_2$ is then sent along pipe segment 4 where it splits and half of the $CO_2$ continues to pass through the precooler, thus removing heat from the precooler. The hot $CO_2$ along pipe segment 5 is then compressed in main compressor, gathers additional heat from the low temperature recuperator and merges with the other half of the $CO_2$ which has been recompressed at flow merge 9. The recombined and compressed $CO_2$ is then applied to the heater along pipe segment 10. The heat added to the $CO_2$ after stage 10 in the heater may be sourced from burning fuel, from solar or from geothermal. The S—$CO_2$ cycle serves to conserve heat lost at the exit of the turbine and provides a preheated $CO_2$ stream to the heater. (See Ahn, Y.; Bae, S.; Kim, M.; Cho, S.; Cha, J.; Baik, S.; Lee, J., "Review of supercritical $CO_2$ power cycle technology and current status of research and development". Nucl Eng Technol 2015; 47:647-61. doi:10.1016/j.net.2015.06.009 and Wright, S., Anderson, M., "Supercritical $CO_2$ cycle for advanced NPPs", Workshop on New Cross-cutting Technologies for Nuclear Power Plants, University of Wisconsin, Madison, Wis., USA, both incorporated herein by reference in their entirety).

Organic fluids have been used in ORC and S—$CO_2$ cycles for power generation. (See Zhang X R, Yamaguchi H, Fujima K, Enomoto M, Sawada N. "Study of solar energy powered transcritical cycle using supercritical carbon dioxide". Int J Energy Res 2006; 30:1117-29. doi:10.1002/er.1201; Cha et al.; Bao J, Zhao L. "A review of working fluid and expander selections for organic Rankine cycle. Renew Sustain Energy Rev 2013"; 24:325-42. doi:10.1016/j.rser.2013.03.040 and Crespi F, Gavagnin G, Sanchez D, Martinez G S. "Supercritical carbon dioxide cycles for power generation: A review". Appl Energy 2017; 195:152-83. doi:10.1016/j.apenergy.2017.02.048, each incorporated herein by reference in their entirety).

Thermal energy from the earth can be utilised in two ways. Shallow ground at the top 10 feet of the Earth's surface remains at a constant temperature of 10-16° C. throughout the year. Geothermal heat pumps use this constant temperature to provide cooling or heating during summer and winter respectively. Another way to utilize the energy from the Earth is by accessing high temperature thermal energy at depths of 5-8 km below the surface of the earth. At these depths, rocks are generally hot and dry. Cold water can be injected underground through a pipe so that water turns into steam on contact with the hot rocks. The steam rises to the surface to be collected through another pipe. The collected steam can be used to either directly power a Rankine cycle or transfer the thermal energy to another fluid such as an ORF which in turn will be used to produce power. Considerable research has been performed regarding the use of geothermal energy to produce power. (See Gallup, D., "Production engineering in geothermal technology: A review". Geothermics 2009; 38:326-34. doi: 10.1016/j.geothermics.2009.03.001; Chang, J., Leung, D., Wu, C., Yuan, Z., "A review on the energy production, consumption, and prospect of renewable energy in China". Renew Sustain Energy Rev 2003; 7:453-68. doi:10.1016/ S1364-0321(03)00065-0; Hepbasli, A.; Ozgene, R., "Development of geothermal energy utilization in Turkey: A review". Renew Sustain Energy Rev 2004; 8:433-60. doi: 10.1016/j.rser.2003.12.004; Olasolo P, Juárez, M.; Morales, M.; Damico, S.; Liarte, I.; "Enhanced geothermal systems (EGS): A review". Renew Sustain Energy Rev 2016; 56:133-44. doi:10.1016/j.rser.2015.11.031; Lu, S., "A global review of enhanced geothermal system (EGS)". Renew Sustain Energy Rev 2018; 81:2902-21. doi:10.1016/ j.rser.2017.06.097; Barbier, E., "Nature and technology of geothermal energy: A review". Renew Sustain Energy Rev 1997; 1:1-69. doi:10.1016/S1364-0321(97)00001-4; Zhu, J.; Hu, K.; Lu, X.; Huang, X.; Liu, K.; Wu, X., "A review of geothermal energy resources, development, and applications in China: Current status and prospects". Energy 2015; 93:466-83. doi:10.1016/j.energy.2015.08.098; Fridleifsson, I. "Status of geothermal energy amongst the world's energy sources". Geothermics 2003; 32:379-88. doi:10.1016/j.geothermics.2003.07.004, each incorporated herein by reference in their entirety).

U.S. Pat. No. 3,986,362, disclosed a design for geothermal power plant with intermediate superheating and simultaneous generation of thermal and electrical energy. The design utilised heat from a geothermal reservoir to heat liquid sodium to store thermal heat. The thermal heat stored in the liquid sodium was used to provide energy for an ammonia powered turbine. Different designs for the underground reservoir pipe configurations were also suggested.

U.S. Pat. No. 4,201,060 disclosed a design for a geothermal power plant which utilised heat from hydrothermal formations (shallow underground HX) to preheat water which would then be sent inside the deep geothermal reservoir to be superheated. The superheated steam in turn powered a steam turbine to generate electricity.

U.S. Pat. No. 4,542,625 disclosed a configuration for a geothermal power plant that used steam to first produce power from a steam turbine. The exhaust of the steam turbine was then used to power a closed organic Rankine cycle to produce additional power. After transferring its heat to the organic Rankine cycle, the steam was condensed to water which was injected in a geothermal reservoir.

U.S. Pat. No. 4,982,568 disclosed an apparatus for converting heat from the geothermal fluid to electric power. The geothermal fluid was used to superheat a multicomponent fluid stream which was allowed to expand in a turbine to produce electricity. The remaining thermal energy from the multicomponent fluid was used to preheat the multicomponent fluid before being heated by the geothermal fluid.

U.S. Pat. No. 7,178,337 B2 described utilising energy from renewable sources, such as wind, tidal and solar, and sequestering it in underground heat energy reservoirs for long term storage. Short term energy storage in the form of compressed gases was also described. The stored energy was proposed to be utilised to produce electricity. In the same field, U.S. Pat. No. 7,472,548 B2 disclosed storing solar thermal energy in depleted oil reservoirs in the form of hot fluids, which results in a synthetic geothermal reservoir.

U.S. Pat. No. 9,297,367 B2 disclosed a combined geothermal and solar thermal organic Rankine cycle (ORC) to produce power. The thermal energy from the geothermal fluid was used to power ORC, which was augmented by solar energy to increase the temperature of the organic fluid. In one of the variations of the design, the thermal energy of the geothermal fluid was enhanced by using solar energy. The geothermal fluid is then used to power the ORC. In another variation, the solar fluid and geothermal fluid use different heat exchangers to provide power to the ORC.

WO 2018/102265 A1 discloses a hybrid geothermal and solar power plant which uses organic fluids or $CO_2$ as the working fluid which runs at least one turbine. The geothermal well is a deep geothermal well of temperature about 100 C and the fluid is flash heated by a heater before entering a turbine. A solar panel provides heat to a second fluid which operates a second turbine. Excess heat in the fluids from both the solar cycle and the turbines is cooled by a cooling tower before injecting into a second geothermal well.

As noted in the descriptions of the conventional power generation systems described above, heat sources used in most power plants typically rely on nuclear fission or the combustion of fossil fuels such as coal, natural gas, and oil, or concentrated solar power, all of which have significant environmental drawbacks.

Accordingly, it is one object of the present disclosure to provide hybrid solar-geothermal electrical power generation systems which utilize high temperature heat from deep geothermal reservoirs, heat from solar collectors and heat transfer to a working fluid to provide electric power, heating and cooling. The working fluid is preferably supercritical $CO_2$, which does not require high temperature heat addition.

SUMMARY

In an exemplary embodiment, a hybrid solar-geothermal electrical power generation system comprises combined deep geothermal heat and solar heat provisioning cycles to transfer heat to a power generation cycle utilizing organic fluids or supercritical $CO_2$ as a working fluid to turn a turbine connected to an electric power generator. Excess heat may utilized to operate a vapor absorption cycle and/or stored in a low temperature shallow geothermal reservoir.

In another exemplary embodiment, a hybrid geothermal electrical power generation system uses steam from a high temperature deep geothermal reservoir to turn a steam turbine connected to a first electric power generator. Excess heat is transferred to a supercritical $CO_2$ working fluid which turns a $CO_2$ turbine connected to a second electric power generator. A condenser transfers remaining heat to pumping system which stores the heat in a low temperature shallow geothermal reservoir.

In another exemplary embodiment, a hybrid solar-geothermal electrical power generation system is described in which a solar collector adds heat to a geothermal fluid. The heated geothermal fluid transfers the heat to a steam power generation cycle which turns a steam turbine connected to a first electric power generator. Excess heat is utilized to vaporize a supercritical $CO_2$ working fluid which turns a $CO_2$ turbine connected to a second electric power generator or a vapor compression compressor.

Other embodiments may include valves to combine or bypass heat transfer fluid flows, pumps to actuate flow through the systems and a control system to operate the valves, pumps, electric power generators or compressors to regulate electrical production, heating and cooling.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
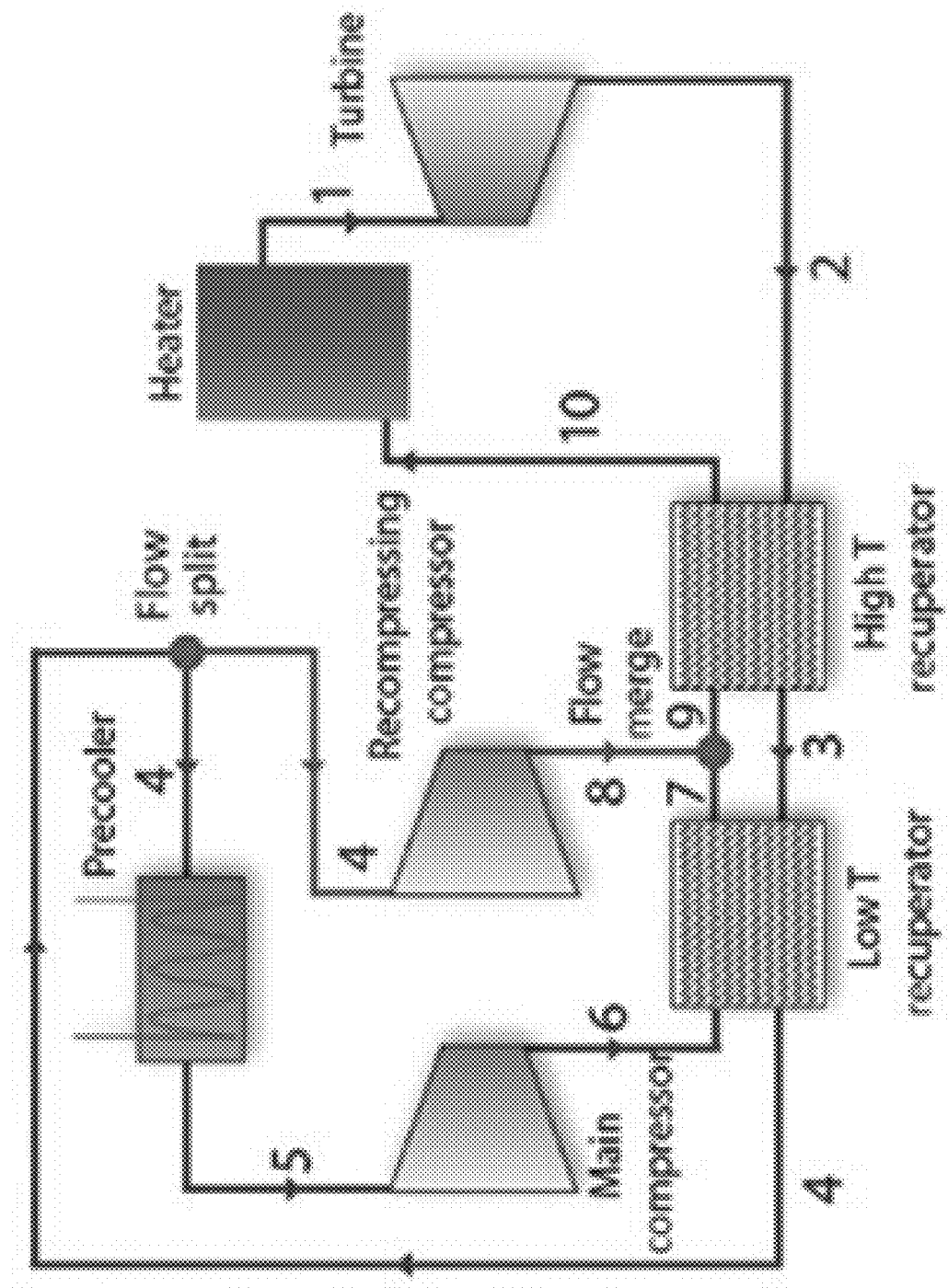
FIG. 1A illustrates a typical S—$CO_2$ cycle.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of the present disclosure are directed to a systems for hybrid solar-geothermal electrical power generation which recuperates heat lost in the production cycle and utilizes the heat to operate further power generation, heating or cooling units.

Aspects of the present disclosure describe the use of combined power cycles (including the organic Rankine cycle and the S—$CO_2$ cycle) as well as the integration of an absorption refrigeration cycle to make use of the waste energy from the condenser of the power cycle.

Aspects of the present disclosure describe implementations of the S—$CO_2$ cycle of FIG. 1A.

Supercritical $CO_2$ is a fluid state of carbon dioxide where it is held above its critical point (i.e., critical pressure and temperature). The critical pressure of $CO_2$ is 7.38 MPa and the critical temperature is 30.98° C. The density above the critical point is similar to that of a liquid, thus the compressor pumping power is significantly reduced, increasing thermal-to-electric energy conversion efficiency.

While conventional power plant cycles produce power from turbines using water or steam as the working fluid, supercritical carbon dioxide (S—$CO_2$) cycles use $CO_2$ that is in a supercritical state, that is, at a temperature and pressure above its critical point where liquid and gas phases are not distinguishable. $CO_2$ behaves as a gas in air at standard temperature and pressure (STP), or as a solid called dry ice when frozen. If the temperature and pressure are both increased above the critical point for $CO_2$, it adopts properties midway between a gas and a liquid. At this state, S—$CO_2$ can be used efficiently throughout the entire Brayton cycle. A consequence of this is that $CO_2$ can be compressed directly to supercritical pressures and readily heated to a supercritical state before expansion. In a heat engine, this property facilitates a good thermal match to the heat source. The critical temperature (30.98° C.) is also high enough that there is heat rejection from the cycle at terrestrial ambient temperatures. Therefore, the system is highly efficient due to the large temperature difference. $CO_2$ near its critical point becomes more incompressible, thus the work of compression can be substantially decreased, leading to high cycle efficiency.

The expansion valve is preferably a bi-directional thermostatic expansion valve. A bi-directional thermostatic expansion valve is preferably used in place of two conventional expansion devices and may function to control refrigerant flow to either coil when the coil is serving as a system evaporator. The bi-directional valve is preferably used in systems that are constructed as packaged units with close coupled components, e.g., with a bulb and external equalizer mounted to a common suction line. The flow direction for the bi-directional valve may be reversed according to the heating/cooling configuration and/or thermal differentials between heat and cool sources.

The S—$CO_2$ cycle illustrated by FIG. 1A illustrates the process by which S—$CO_2$ heat engines generate power and is similar to that for a steam Rankine cycle or a Brayton gas cycle.

In general, power output depends on the temperature difference between a heat source and a cold source. The higher the difference, the more mechanical power can be efficiently extracted out of the heat energy.

Aspects of the present disclosure describe a solar energy heat source coupled with a deep geothermal energy heat source to provide the heat necessary for a $CO_2$ working fluid to reach the supercritical temperature.

MPa, maximum cycle efficiency is an estimated 34.5%. Table 1 shows that maximum cycle efficiency increases with turbine inlet temperature and turbine inlet pressure. (See Siddiqui, M.; Almitani, K., "Energy Analysis of the S—CO2 Brayton Cycle with Improved Heat Regeneration", Nov. 28, 2018, Processes 2019, 7, 3; doi:10.3390/pr7010003, incorporated herein by reference in its entirety).

TABLE 1

Maximum cycle efficiency variation with turbine inlet temperatures and pressures

| Turbine inlet temperature (° C.) | 500 | 550 | 600 | 650 | 700 | 750 | 800 | 850 |
|---|---|---|---|---|---|---|---|---|
| Turbine inlet pressure (MPa) | 17.2 | 17.9 | 18.6 | 19.3 | 20 | 20.7 | 21.4 | 22.1 |
| Thermal efficiency (%) | 44.1 | 46.8 | 49.2 | 51.4 | 53.3 | 55.0 | 56.7 | 58.2 |

The efficiency of a steam Rankine cycle is limited by the high heat of vaporization of the working fluid. Also, unless the pressure and temperature reach super critical levels in the steam boiler, the temperature range of the cycle is quite small: steam turbine entry temperatures are typically around 565° C. and steam condenser temperatures are around 30° C. This gives a theoretical maximum Carnot efficiency for the steam turbine alone of about 63.8% compared with an actual overall thermal efficiency of up to 42% for a modern coal-fired power station. When the turbine inlet temperature is greater than 550° C., the ultra-supercritical (USC) steam cycle is more efficient by suffers from material degradation due to the increased high temperature and pressure.

Figure 1B:
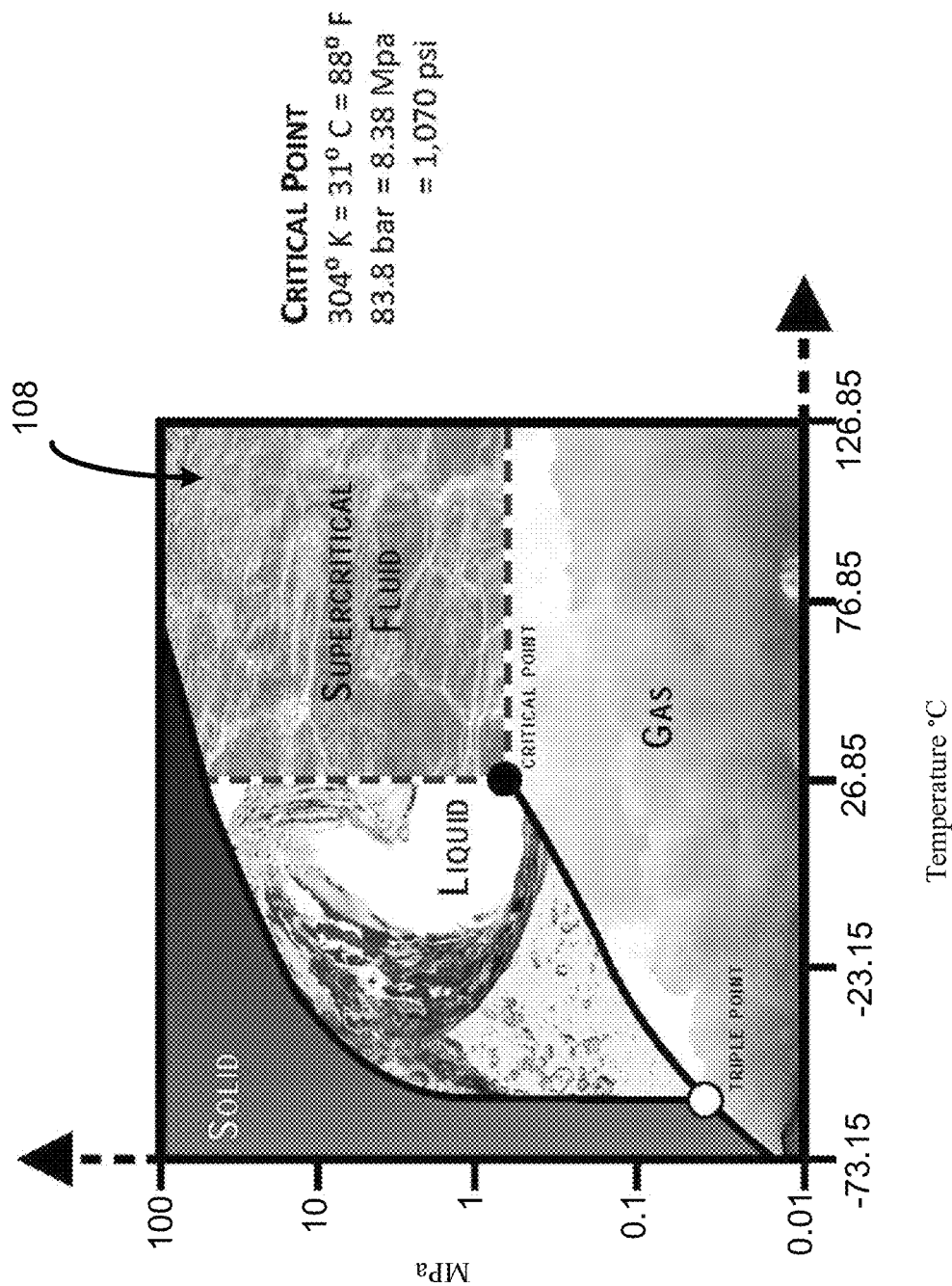
FIG. 1B shows the critical point for $CO_2$.

The S—$CO_2$ Brayton cycle is a power conversion system which combines the advantages of both the steam Rankine cycle and gas turbine systems. As the fluid is compressed in the incompressible region, the higher turbine inlet temperature can be utilized with fewer material issues as compared with the steam Rankine cycle. The S—$CO_2$ supercritical phase is 31° C. at 8.38 MPa as illustrated in FIG. 1B. The supercritical region 108 represents the fluid state of $CO_2$. (See Patel, S., "What are supercritical $CO_2$ power cycles?", Connected Plant Conference, Mar. 1, 2019, incorporated herein by reference in its entirety).

One of the main advantages of the S—$CO_2$ Brayton cycle is its compact turbomachinery. As the system operates beyond the critical point, the minimum pressure is higher (about 7.4 MPa) than existing steam Rankine cycles (a few kPa) or gas Brayton cycles (about 100 kPa), thus the fluid remains dense throughout the entire power system. Therefore, the volumetric flow rate decreases as the fluid density increases, resulting in turbomachinery that is 10 times smaller compared with the turbomachinery of a steam Rankine cycle.

However, the cycle pressure ratio of the S—$CO_2$ Brayton cycle is much smaller compared with the steam Rankine cycle and the turbine outlet temperature is relatively high. Therefore, a large amount of heat must be recuperated to increase the thermal efficiency. In other words, the recuperation process in the S—$CO_2$ Brayton cycle greatly influences the thermal efficiency. In a simple closed-loop S—$CO_2$ Brayton cycle, the working fluid ($CO_2$) is heated indirectly from a heat source through a heat exchanger (as steam would be heated in a conventional boiler), energy is extracted from the $CO_2$ as it is expanded in the turbine, $CO_2$ exiting the turbine is then cooled in a heat exchanger to the desired compressor inlet temperature and, after compression to the required pressure, the $CO_2$ is sent back to the heater to complete the cycle. At a turbine inlet temperatures (TIT) of 500-850° C. and a minimum turbine exit pressure of 8.27

The thermodynamic performance of S—$CO_2$ recompression Brayton cycles is greatly influenced by a number of parameters, such as the turbine inlet temperature, cycle pressure ratio, split ratio, heat exchanger effectiveness, and the minimum allowed temperature in the heat exchangers.

Cold sources conventionally used in power plants are usually cooling towers and/or a large water body (river or sea). The efficiency of the cycle is limited on the cold side by the lower practical temperature of the working fluid. Aspects of the present disclosure describe the use of shallow geothermal energy to provide the cold source in an S—$CO_2$ thermal cycle.

The working fluid in a steam Rankine or gas Brayton cycle follows a closed loop and is reused constantly. A shallow geothermal source may operate as a large heat exchanger by absorbing the latent heat of vaporization of the working fluid and simultaneously evaporating cooling water (by a condenser) to the atmosphere.

Substances used as the working fluid in the Rankine cycle have conventionally been water or organic fluids. Organic fluids other than $CO_2$, preferably low boiling point substances, include CGCs such as Freon, isopentane, isobutane, nbutane, and n-chlorobutane, can be chlorofluorocarbon (CFCs), hydrofluorocarbons (HFC) or hydrocarbons such as isobutane, pentane, propane etc. However, compared to organic and steam-based Rankine Cycle systems, supercritical $CO_2$ can achieve high efficiencies oer a wide temperature range of heat sources with compact components resulting in a smaller system footprint, lower capital and operating costs.

Figure 1C:
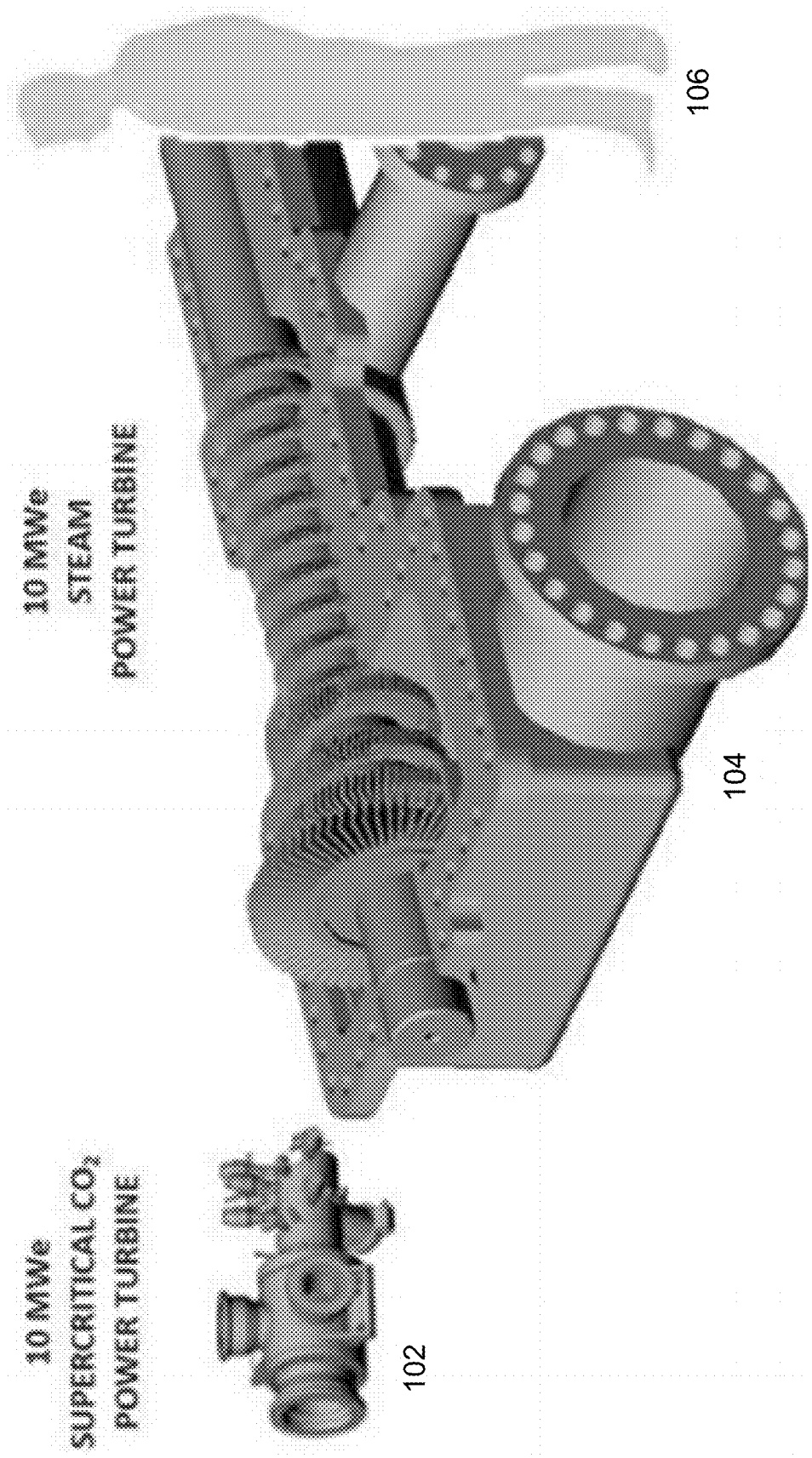
FIG. 1C shows a size comparison between a $CO_2$ turbine and a steam turbine.

The turbine size of an S—$CO_2$ turbine is much smaller than a steam turbine. FIG. 1C shows the relative sizes of a 10 MWe supercritical $CO_2$ power turbine 102 and a 10 MWe steam power turbine 104. A 6 ft. tall human FIG. 106 is shown to represent the scale of the turbines.

S—$CO_2$ power cycles are potentially applicable to a wide variety of power-generation applications. Nuclear power, concentrated solar thermal, fossil fuel boilers, geothermal, and shipboard propulsion systems are areas of application for S—$CO_2$ cycles which may replace traditional steam Rankine cycles.

Aspects of the present disclosure utilize geothermal reservoirs to provide heat directly or indirectly to an electrical power generation system or to remove excess heat from the system.

Figure 1D:
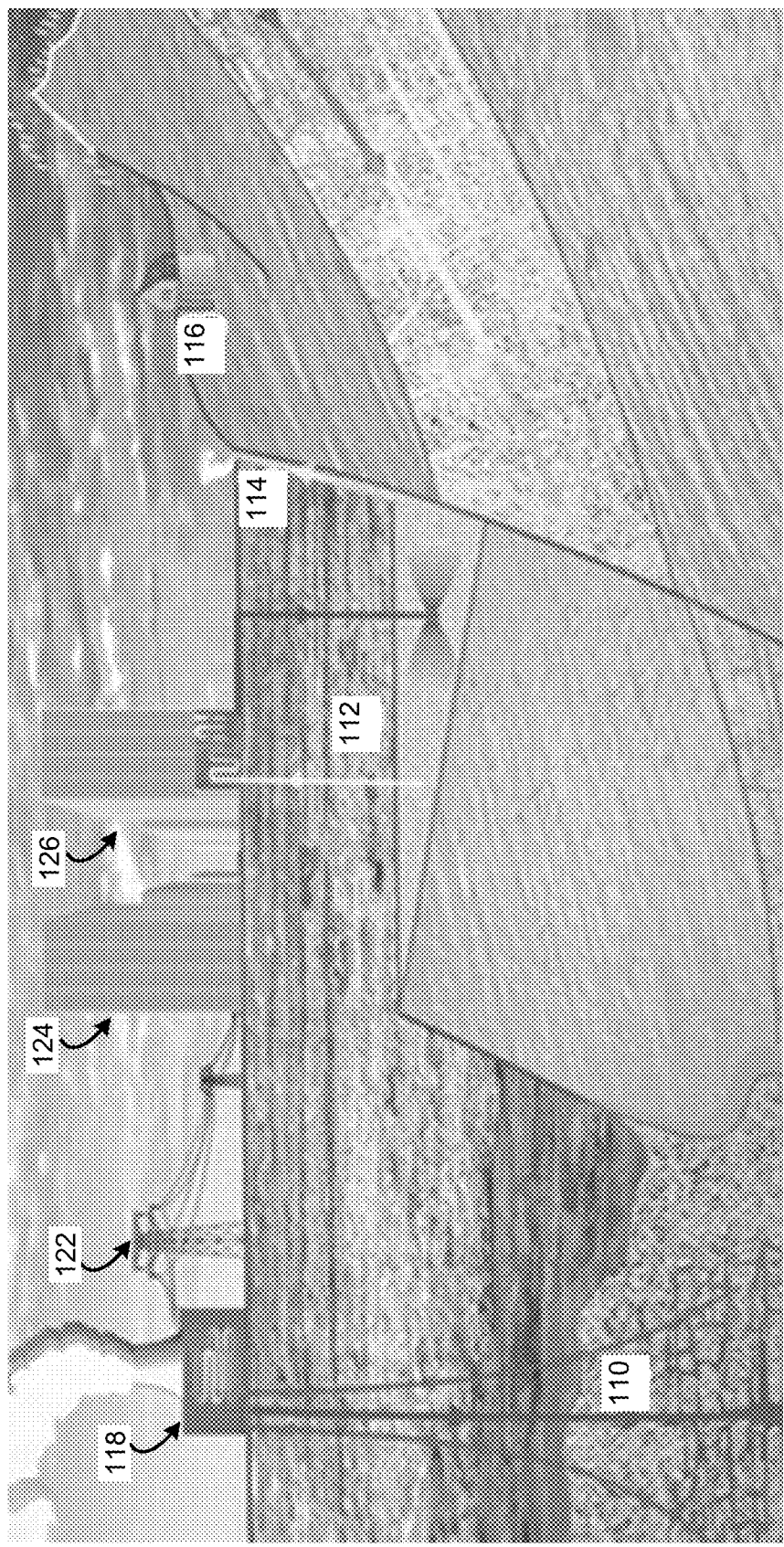
FIG. 1D illustrates the subsurface arrangements of geothermal reservoirs.

A geothermal reservoir is a layer within the subsurface of the earth. Depending on the depth and type of material, layers of the reservoir are at different temperatures. These temperature differences may be exploited in an energy production cycle. FIG. 1D illustrates a steam power plant 118 which utilizes heat from a deep geothermal layer 110 to power a turbine (not shown) to produce electricity (note electrical lines 122) which is provided to power building 124.

Examples of different types of geothermal reservoirs are:

110) High temperature reservoir: In a deep granitic basement beneath a sedimentary cover (ratio units with a thermal conductivity contrast promotes the geothermal gradient), cold water is injected and hot water is extracted in such a way that in contact with a second surface circuit (heat sink in 118), hot steam is generated for electricity production. These reservoirs provide enough heat to make electricity from steam profitably. High temperature reservoirs are generally at more than 150° C., and are located in areas of thin lithospheric thinness or active volcanism.

112) Middle temperature reservoir: Hot groundwater is drawn from a deep aquifer to exchange heat within an urban district heating system (within building 126), and cold water is re-injected. Despite these reservoirs have a lower temperature compared to those of high temperature, sufficient heat may be extracted to produce electricity (but with lower performances) by using a volatile fluid. The reservoirs usually reach temperatures between 100 and 150° C., and are located in areas with favourable structural and geological contexts and geothermal gradients higher than the average. Their direct use may be in heating mode and their main applications are in district heating systems and industrial processes.

114) Low temperature reservoir: The temperature of these reservoirs is between 30 and 100° C. They are located in areas with a favourable geological context including deep aquifers; the geothermal gradient is like the average in the region. Their exploitation involves pumping hot groundwater from the aquifer and re-injecting it after it has delivered the heat and is cold again. These are used in direct applications and for district heating systems and industrial processes. 116) Very low temperature reservoir: Ground thermal inertia is exploited through a buried heat exchanger that provides a stable fluid temperature to heat a house in winter and cool it in summer. The temperature of these reservoirs is below 30° C. In these, the underground is used as a heat exchanger, by means of a heat pump in a closed circuit. Their applications are in domestic and agricultural air conditioning systems. (See "What is a geothermal reservoir? Types of geothermal reservoirs", IGC, Parc de Montjuïc. E-08038 Barcelona, Spain, 2011, http://www.icgc.cat/ca/, incorporated herein by reference in its entirety).

Geothermal well(s) have dual operating modes, i.e., storage mode and power production mode, wherein at least one of the well or wells is configured to run geothermal fluid from a geothermal production well past a heat exchanger and transfer heat to a second medium. The second medium can be water, $CO_2$, or organic fluids, such as chlorofluorocarbon (CFCs), hydrofluorocarbons (HFC) or hydrocarbons such as isobutane, pentane, propane etc. At least one of the well or wells may be configured to run geothermal brine in a conventional Rankine process loop for direct power production from the hot brine.

It should be noted that, in order to retrieve heat from the subsurface, it is necessary to drill a well deep enough to reach the optimum operation temperatures and to install a water piping system. These factors entail costs which increase with depth.

In aspects of the present disclosure, at least one valve or other process control apparatus is used to switch between operating modes. In power production mode, the at least one valve or other process control apparatus is set to divert some or all hot fluid (heated by a geothermal production well pipe) through a solar panel heat sink arrangement or to a thermal energy storage reservoir. In storage mode, the hybrid power plant may be configured to run at least one or more turbine(s) from stored geothermal heat from the thermal energy storage system (through heat transfer at a heat sink) to the working fluid of the power plant. The injection well may receive the heat depleted fluid through a second pipe and reinject the heat into the geothermal reservoir. The valves may be operated to provide heated fluid from the solar collector to a working fluid which turns the turbine during times of high solar irradiance and to provide heated fluid from the thermal storage reservoir during the night or at times of low solar irradiance, such as rainy days.

Figure 1E:
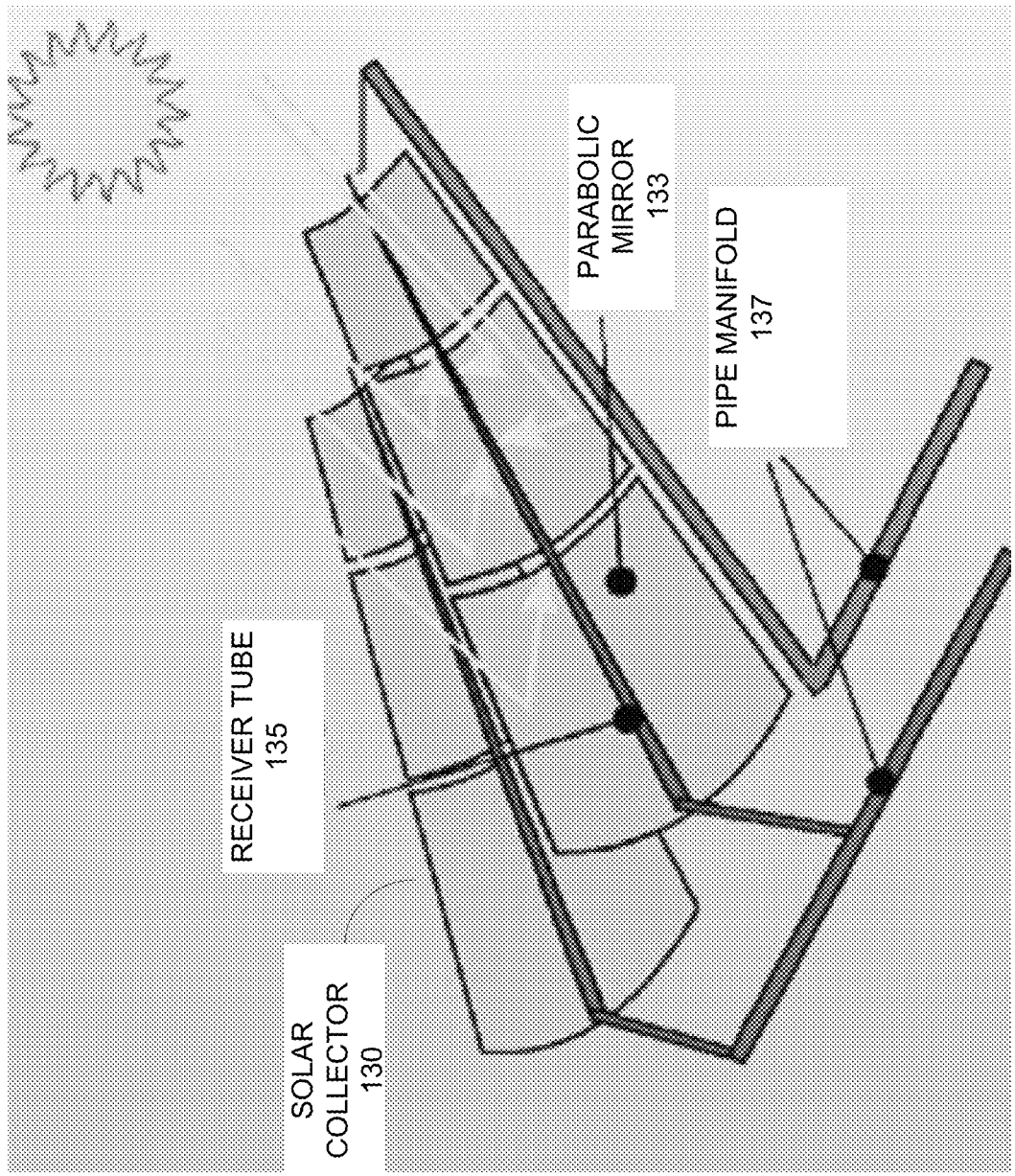
FIG. 1E illustrates a solar collector.

In aspects of the present disclosure, a solar collector may be used to increase the temperature of a heat transfer fluid. A solar collector is a device which concentrates solar energy onto a system of pipes to raise a working fluid to high temperatures. The solar collector may be a one of a flat plate solar collector, a solar tower, a Fresnel based heater, an evacuated tube solar collector and a parabolic trough collector 130 as shown in FIG. 1E. Parabolic trough collectors are frequently employed for solar steam generation because relatively high temperatures can be obtained without serious degradation in the collector efficiency. A parabolic trough collector (PTC) is a linear concentrating system made of long, parabolic-shaped mirrors 133 and a receiver tube 135 placed along the focal axis of the parabola. It uses a single-axis tracking curved mirror system to concentrate solar radiation onto a single point. The receiver tube 135, containing a heat transfer fluid, is located at the focal point of the mirror and collects the concentrated solar heat energy. A pipe manifold 137 distributes the working fluid to/from the receiver tubes. The operating temperatures of parabolic trough systems are 300-550° C. (See Kalogirou, S., "Industrial Process Heat, Chemistry Applications, and Solar Dryers", Solar Energy Engineering (Second Edition), 2014; Science Direct Topics; Moya, E., "Parabolic-trough concentrating solar power (CSP) systems", Concentrating Solar Power Technology, 2012, Science Direct Topics; Miller, B., "Emerging Technologies for Reduced Carbon Footprint", Clean Coal Engineering Technology (Second Edition), 2017, Science Direct Topics; U.S. Department of Energy, "Energy efficiency and renewable energy", July 2006, www.eere.energy.gov, each incorporated herein by reference in its entirety). A parabolic trough solar collector is shown in the figures of the present disclosure, however other concentrated solar collectors may be used, such as a solar tower, Stirling dish, solar Fresnel, flat plate solar collector or an evacuated tube solar collector.

An overview of a preferred embodiment is illustrated with respect to FIG. 2. The arrowed lines connecting the elements represent pipes fluidly connected to the elements.

The production cycle includes three sub-cycles:

1. A solar/HTF (high-temperature fluid) cycle including a first working fluid 231 which is a partially hydrogenated polyphenyl hydrocarbon, such as therminol, or water, a solar collector 230, a thermal energy storage reservoir 234 (TES), a first heat exchanger 232 which transfers heat in geothermal fluid 211 from a deep geothermal reservoir 210 to/from the first working fluid 231, a first pump 236 to actuate the flow of the first working fluid 231 and a second heat exchanger 238 to transfer heat from the first working fluid 231 to a second working fluid 241 which is composed of organic fluid or $CO_2$. The heated working fluid 231 from the solar collector may pass through and heat TES 234 which stores the energy for utilization at times of low solar radiation or during the night.

2. An organic fluid/S—$CO_2$ cycle including the second working fluid 241 which is composed of CGCs, HFCs, Hydrocarbons or $CO_2$, a single stage turbine or multistage turbine 240 which produces work by expanding the fluid, a condenser 244 which removes heat from the second working fluid, converting its phase to the liquid region, and a second pump 246 to actuate the flow of the $CO_2$ or organic working fluid 241 through the pipes.

3. Deep and shallow geothermal reservoir fluid cycles.
  a. The deep geothermal reservoir fluid cycle includes a geothermal working fluid 211, which may be water or brine, a third pump 213 and a pipe carrying fluid 211 which passes through the first heat exchanger 232.
  b. The shallow geothermal reservoir 214 operates as a heat exchanger to cool the condenser 244 in the summer months. Since this is a closed system, the working fluid 251 may be either water or $CO_2$. A fourth pump 252 actuates the flow of the working fluid through the condenser 244 and through pipe 254. The working fluid 251 is cooled by the shallow geothermal reservoir to a constant temperature, which does not vary with the seasons.

The heat from the deep geothermal reservoir fluid cycle may be used to heat up the high-temperature fluid (HTF) cycle through heat transfer at heat exchanger 232. The HTF can be further heated by using solar energy from solar collector 230. This energy may be stored in the thermal energy storage 234 to handle fluctuating power demands. The HTF is utilized to heat the organic fluid (ORF) or supercritical $CO_2$ (S—$CO_2$) based cycle to generate electricity. The condenser 244 of the ORF/S—$CO_2$ cycle utilizes the shallow geothermal heat exchanger 214 to cool the fluid 251 in the summer, as the ambient air temperature is much higher than the temperature of the shallow geothermal reservoir 214. In the winter, the condenser may be air cooled. The turbine of the ORF/S—$CO_2$ cycle also powers the second pump 246 to actuate different cycles using the same shaft as that of the turbine.

A condenser is a device for reducing a gas or vapor to a liquid. Condensers are employed in power plants to condense exhaust steam from turbines. Condensers operate by removing heat from the gas or vapor; once sufficient heat is eliminated, liquefaction occurs. The gas is passed through a long tube (usually arranged in a coil or other compact shape) to permit heat to escape into the surrounding air, or into water or other liquid to achieve the heat removal. A heat-conductive metal, such as copper, is commonly used to transport the vapor. A condenser's efficiency is often enhanced by attaching fins (i.e., flat sheets of conductive metal) to the tubing to accelerate heat removal.

Figure 2A:
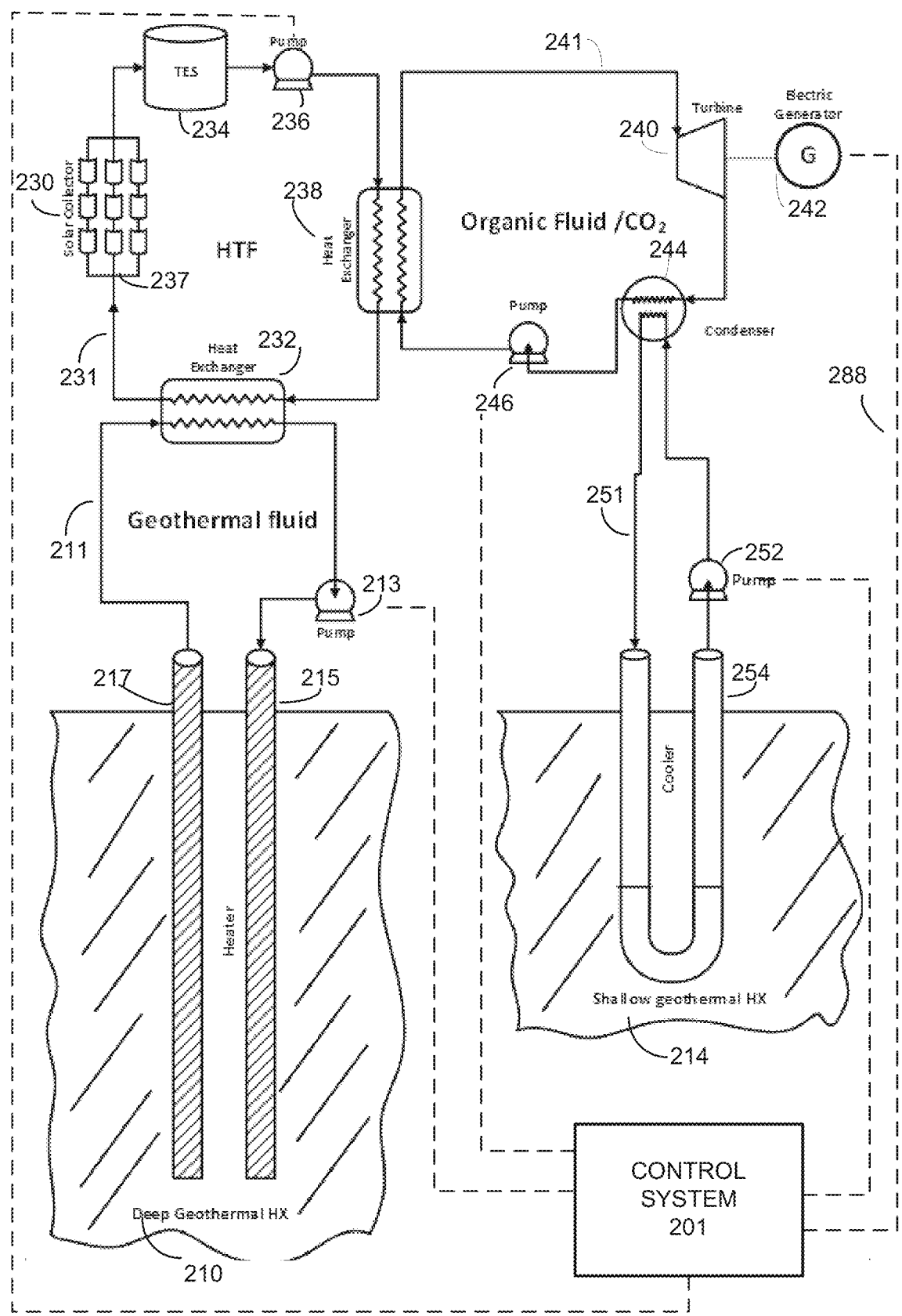
FIG. 2A is an overview of the solar-geothermal power generation system.

A control system 210 is shown in FIG. 2A to control the pumps and regulate the electric power generation.

Figure 3:
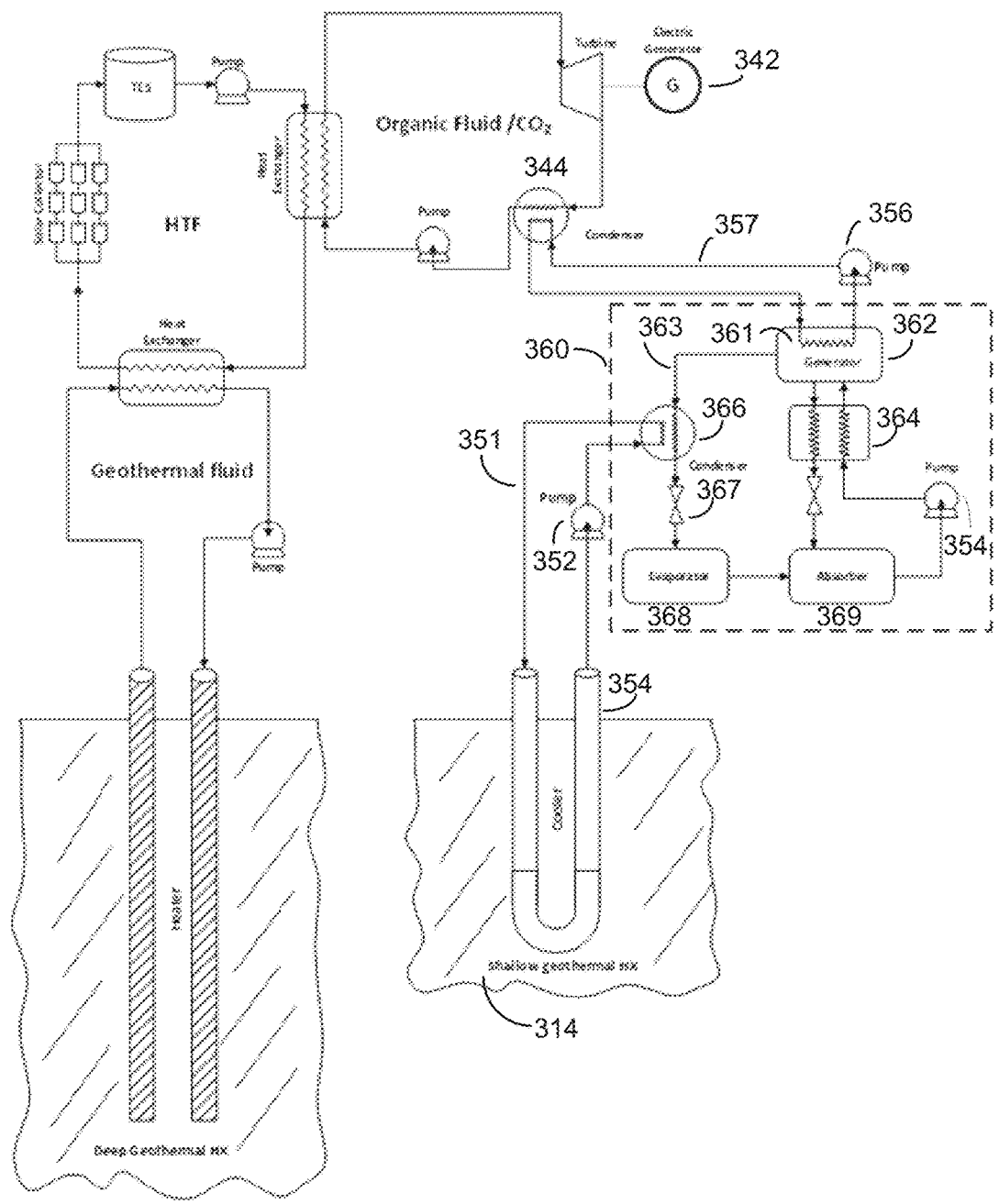
FIG. 3 is a modification of FIG. 2A incorporating a cooling system.

In another aspect of the present disclosure, a modification of FIG. 2A is shown in FIG. 3. In this aspect, the working fluid 357 from the condenser 344 of the power generation cycle is used to run a vapor absorption refrigeration cycle 360 to provide an air-conditioning or cooling effect. A fifth pump 356 actuates a flow of condensed water to exchange heat at generator 362.

There are four main components of the vapor absorption refrigeration cycle: the generator 362, an absorber 369, a second condenser 366, and an evaporator 368 (where the cooling effect is achieved). Heat in the working fluid 357 is transferred, through coil 361, to an absorbent-refrigerant mixture 363 in the generator 362, which causes the mixture to boil, generating water vapor which is pumped to the condenser 366. In a non-limiting example, the absorbent-refrigerant mixture is LiBr—H2O. When the water boils, the LiBr remains. The remaining cooled LiBr with some water is sent to the absorber 369 via a heat exchanger 364 (this returning fraction can be called "weak solution" since it is depleted of refrigerant). The refrigerant 363 (water) is pumped by sixth pump 354 to condenser 366, where it is cooled by the lower temperature of the shallow geothermal fluid 351, which is pumped to the second condenser 366 by fourth pump 352. The refrigerant 363 is then pumped through the expansion valve 367 into the evaporator 368 where heat is input (from outside the system) creating a cooling effect (outside the system), which can be used for air conditioning. The heat input vaporizes the refrigerant. The refrigerant vapor travels to the absorber 369 where it is mixed with the "weak solution of LiBr" and where heat is rejected and leaves the system. The absorber 369 contains a "strong" absorbent-refrigerant mixture, which is delivered by sixth pump 354 back to the generator 362. The solution passes through a heat exchanger 364 where its temperature increases. The pumped mixture is called a "strong solution" because it is rich in refrigerant.

The following practical values of the system parameters are typical for an LiBr-H2O system: generator temperature of about 75° C., evaporator temperature of about 6° C., heat exchanger temperature of about 55° C., "strong" solution of 55% LiBr(aq) by mass fraction and "weak" solution 60% LiBr(aq) by mass fraction. (See Witmer, L., "Solar Thermal Energy for Utilities and Industry, Sec. 8.2. Absorption cooling", Department of Energy and Mineral Engineering, College of Earth and Materials Sciences, The Pennsylvania State University, USA, incorporated herein by reference in its entirety).

This modification enables the organic fluid/S—$CO_2$ cycle to provide air-conditioning, perhaps to another building, while generating power at electric generator 342.

A control system (not shown in FIG. 3) is connected to the pumps, electric generator 342 and generator 362 to regulate the operation of the electric power and vapor absorption cooling.

Figure 4:
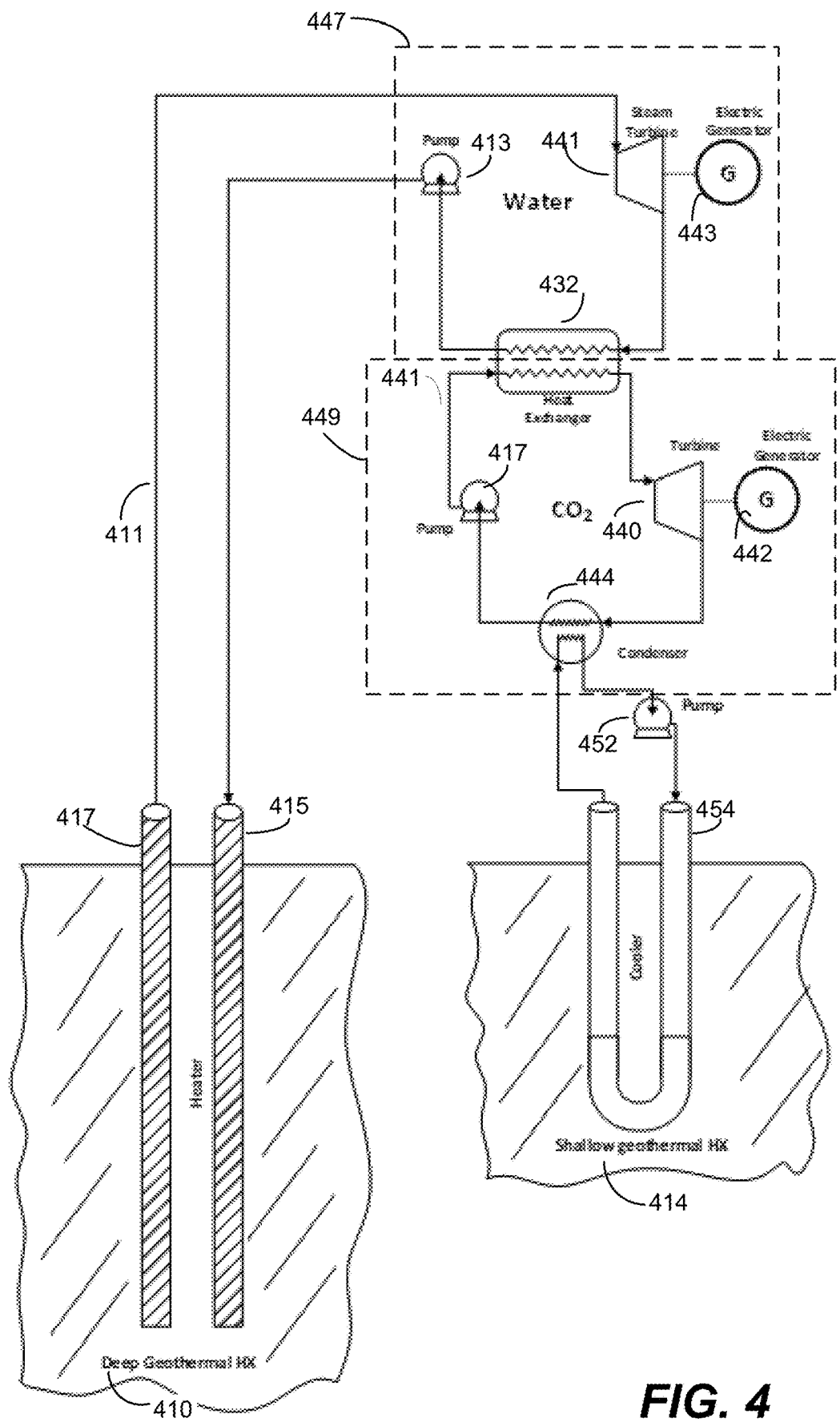
FIG. 4 is a geothermal power generation system with steam and $CO_2$ power generation cycles.

In a further aspect of the present disclosure, as illustrated by FIG. 4, the temperature of a deep geothermal well may be high enough that the solar/HTF cycle may be eliminated or bypassed. The solar collector (not shown) may be switched in on cold days when the pipes are not able to retain the heat from the deep geothermal well before reaching the steam turbine 441. Steam from the geothermal reservoir 410 is used to power a Rankine cycle, which acts as a topping cycle 447, generating high-enthalpy steam at the entry point of turbine 441 and producing high electrical output from generator 443. The residual thermal energy of the steam after it has expanded in the steam turbine is transferred by heat exchanger 432 to power a supercritical carbon dioxide (S—$CO_2$) cycle 449, previously described with respect to FIG. 2, which acts as the bottoming cycle, driving turbine 440 and producing additional electrical energy by electric generator 442. In this aspect, geothermal fluid 411 (water) is used as the working fluid, which, after absorbing heat from the geothermal reservoirs, converts to steam. After passing heat exchanger 432, the cooled water 411 is pumped back into the deep geothermal reservoir through pipe 415 where it again hits the hot rocks and is reconverted to steam. The steam rises through pipe 417 to complete the cycle.

Figure 5A:
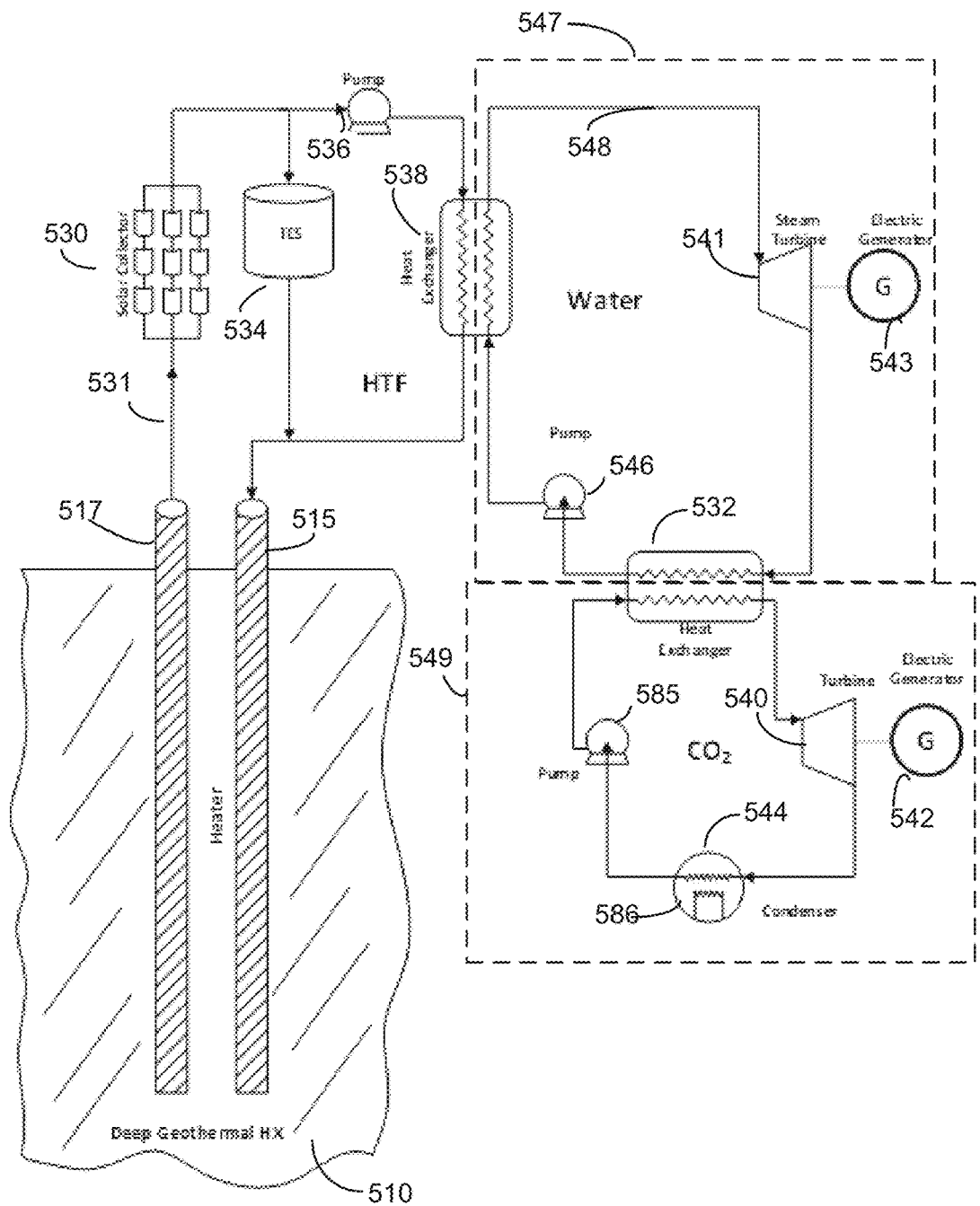
FIG. 5A is a modification of FIG. 2A with steam and $CO_2$ power generation cycles.

In an aspect of the present disclosure, a modification of FIG. 2A with aspects of FIG. 4, is illustrated with respect to FIG. 5A. An HTF 531 absorbs heat directly from the deep geothermal reservoir 510. In this modification, the HTF is water which is passed directly through solar collector 530 to further add thermal energy. The thermal energy can be stored in thermal energy storage (TES) tank 536, which is located between the pump 536 and the outlet line 515. The HTF 531 passes through heat exchanger 538 to power a topping Rankine cycle 547 with steam 548 as the working fluid to generate power. The residual thermal energy of the steam after it has expanded in the steam turbine 541 is heat transferred through heat exchanger 532 and used to power a supercritical carbon dioxide (S—$CO_2$) cycle 549, which acts as the bottoming cycle. The S—$CO_2$ cycle 549 produces additional electric power from the temperature depleted steam. In this variation, the condenser 544 is shown to be air cooled, but may also be water cooled using shallow geothermal heat exchange, as shown in FIG. 4. Shallow geothermal exchange may be necessary during the summer months, when the ambient temperature is too high for effective cooling.

Figure 5B:
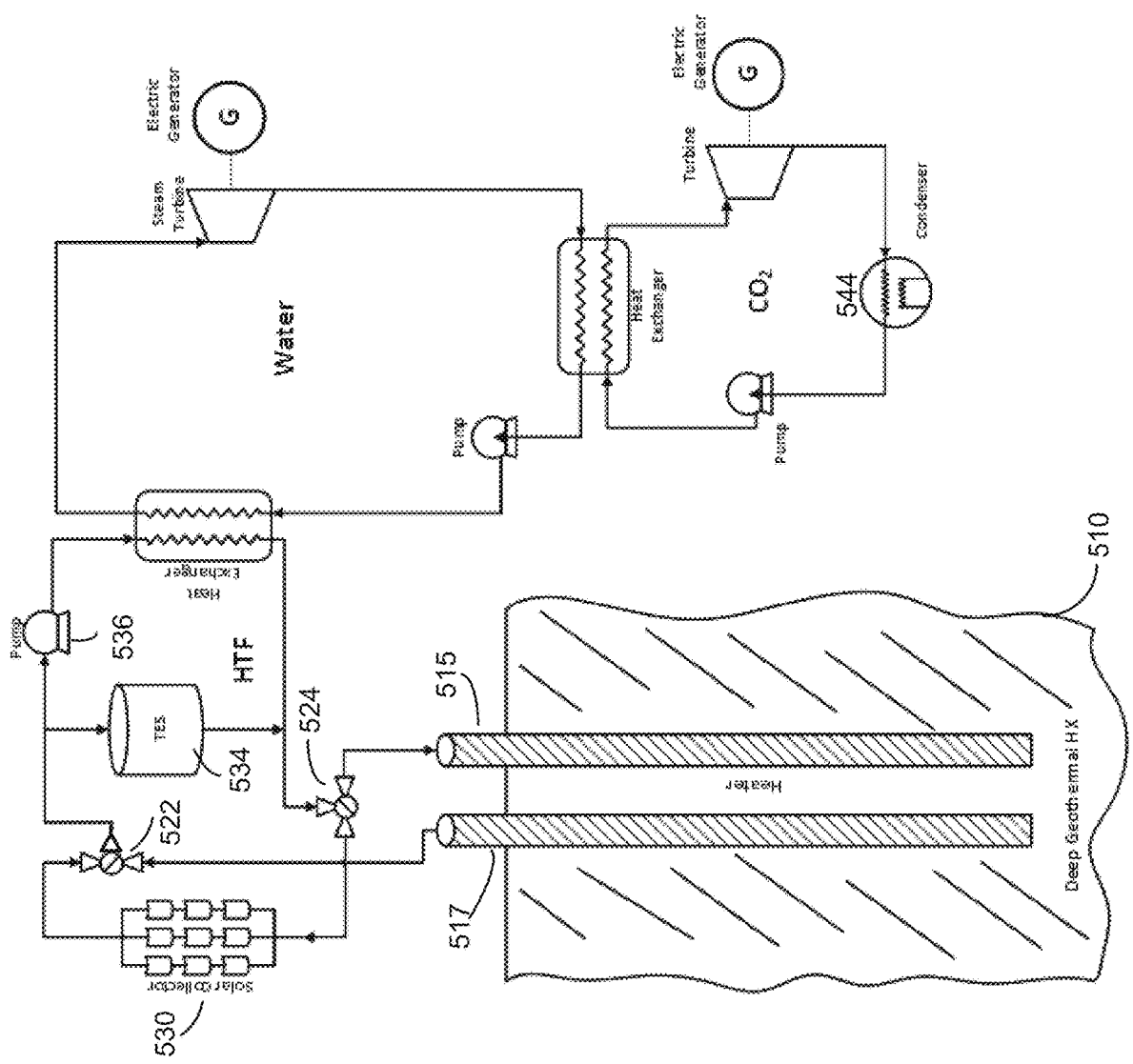
FIG. 5B is a modification of FIG. 5A including valves.

In a further aspect of the present disclosure, the system of FIG. 5B shows a variation of FIG. 5A. In this cycle, a 3-way valve 522 is used to allow the HTF to absorb thermal energy either from the deep geothermal reservoir 510 or from the solar collector 530. The HTF can absorb heat from the geothermal reservoir during the night, while in the day the valves 522 and 524 can be configured such that the HTF flows through the solar collector 530 instead of the geothermal reservoir 510. The valve operation reduces the pumping energy required to pump HTF during the day while ensuring thermal energy is available (from geothermal) during the night to produce electricity. The condenser 544 may also be water cooled using shallow geothermal heat exchange, as shown in FIG. 4.

Figure 6:
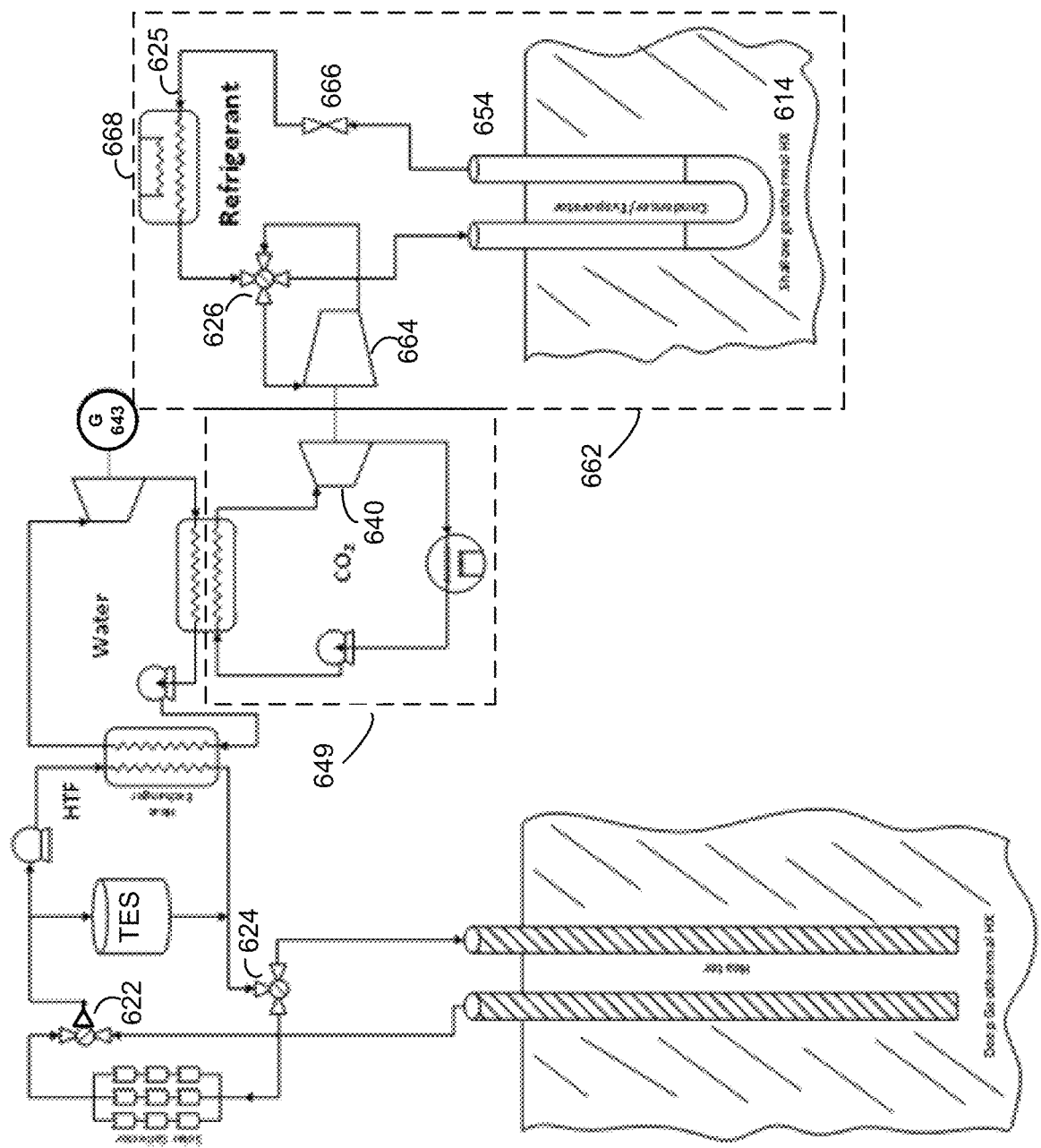
FIG. 6 is a modification of FIG. 5B including an air conditioning cycle.

In a further aspect of the present disclosure, FIG. 6 incorporates aspects of FIG. 2, FIG. 3 and FIG. 5B. In this cycle, the turbine 640 shaft of the S—$CO_2$ cycle is used to operate a compressor 664 to run a vapor compression system 652 (refrigerant cycle) directly. The vapor compression system can provide either heating or cooling as it is equipped with a four way-valve to reverse the flow direction of the refrigerant. In a non-limiting example, the refrigerant 625 may be R-134A. The vapor compression system 662 may use the shallow underground heat exchanger 614 as an evaporator/condenser as the refrigerant is fully enclosed in the pipe 654. Evaporator/heater 668 and expansion valve 666 are operated as known in the heat pump field to provide the heating/cooling. The system of FIG. 6 may provide electricity at generator 643 as well as heating/cooling through vapor compression cycle 662. This allows the system to provide cooling during the summer and heating during the winter.

The valves, vapor absorption cycle and vapor compression cycles may be used in any of the aspects described above, and are not limited to the aspects described.

A control system 201 (not shown in all of the drawings) including controller circuitry and at least one processor having program instructions is configured to actuate the pumps, 3 way valves 522, 524, the 4 way valve 626, connect or disconnect the generators 442, 443 or the compressor 664 from their respective turbines in each of the aspects of FIG. 2A-FIG. 6 to regulate electrical production and heating or cooling. FIG. 2A illustrates the controller 201 connected to pumps 213, 236, 246, and 252 for actuation of the different cycles. Generator 242 is also connected to the controller as shown by dotted line 288 for switching the generator on/off or to different power levels. The electrical components of FIG. 3-FIG. 6 are similarly connected to the generator for efficient operation of the systems shown.

A first embodiment is illustrated with respect to FIGS. 2A and 3. The first embodiment describes a hybrid solar-geothermal electrical power generation system for use with a high temperature deep geothermal reservoir 210, comprising a geothermal heat provisioning cycle including a geothermal fluid supply pipe 217 fluidly connected to the deep geothermal reservoir, a geothermal fluid return pipe 215 fluidly connected to the deep geothermal reservoir, a first pump 213, a first heat exchanger 232 having a first channel and a second channel, wherein the first channel is fluidly connected between the supply pipe and the first pump, wherein the first pump is configured to pump a geothermal fluid through the geothermal heat provisioning cycle and wherein the first heat exchanger is configured to transfer heat from the geothermal fluid 211 in the first channel to a first heat transfer fluid 231 in the second channel.

The geothermal fluid supply pipe 217 preferably has a piping and fluid passage system such that the geothermal fluid maximizes contact and transfer through the geothermal reservoir. Preferably the geothermal fluid is contacted with only a portion of the deep geothermal reservoir. It is important that geothermal fluid loss is limited or eliminated at points other than those portions of the deep geothermal reservoir which permit transmission of the geothermal fluid from the fluid supply pipe to the fluid return pipe. The geothermal fluid supply pipe 217 is therefore preferably a pipe that is sealed and impermeable for most of its length down a wellbore into the deep geothermal reservoir.

Figure 2B:
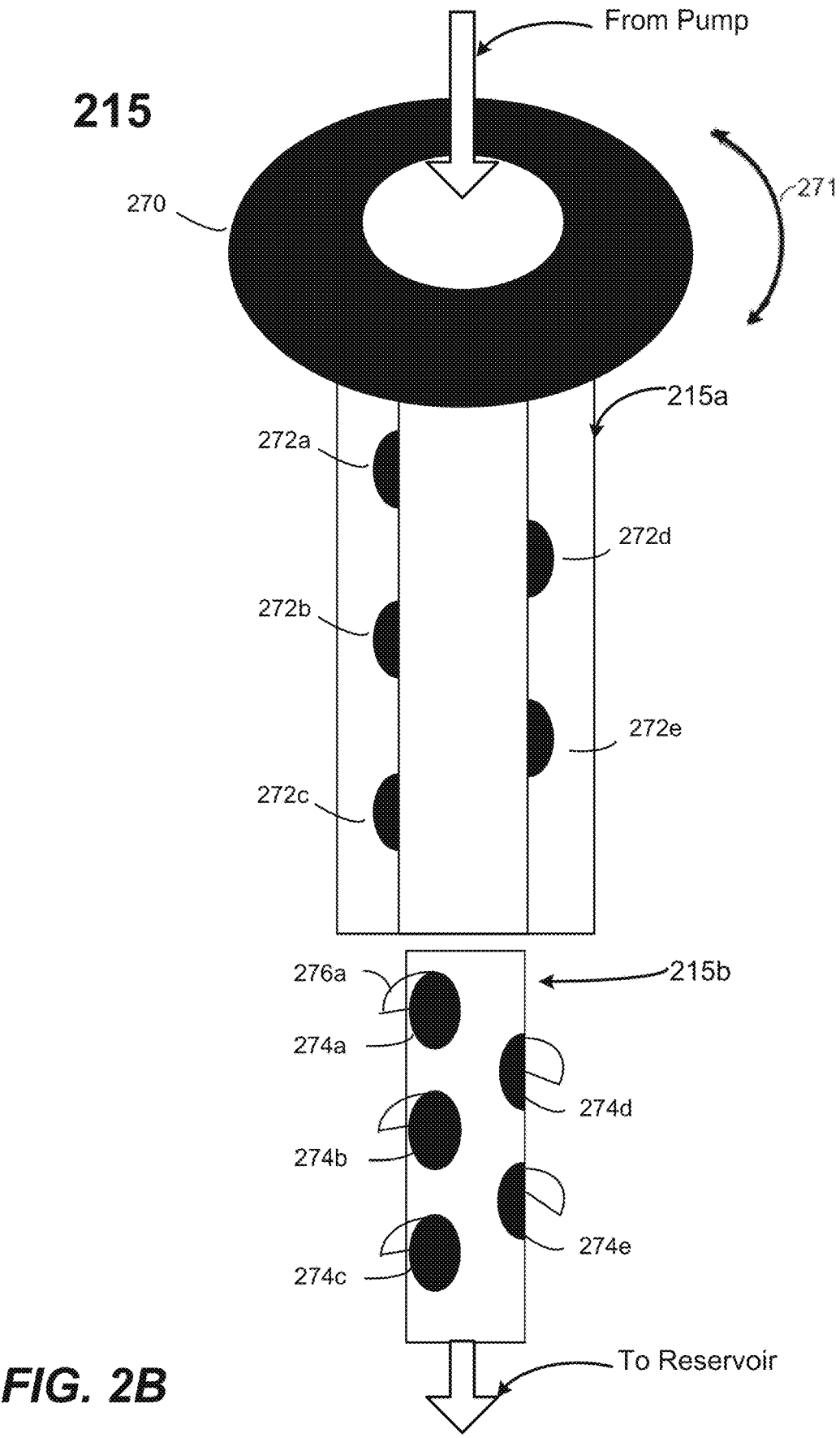
FIG. 2B illustrates inner and outer pipe sections of a geothermal reservoir pipe.
Figure 2C:
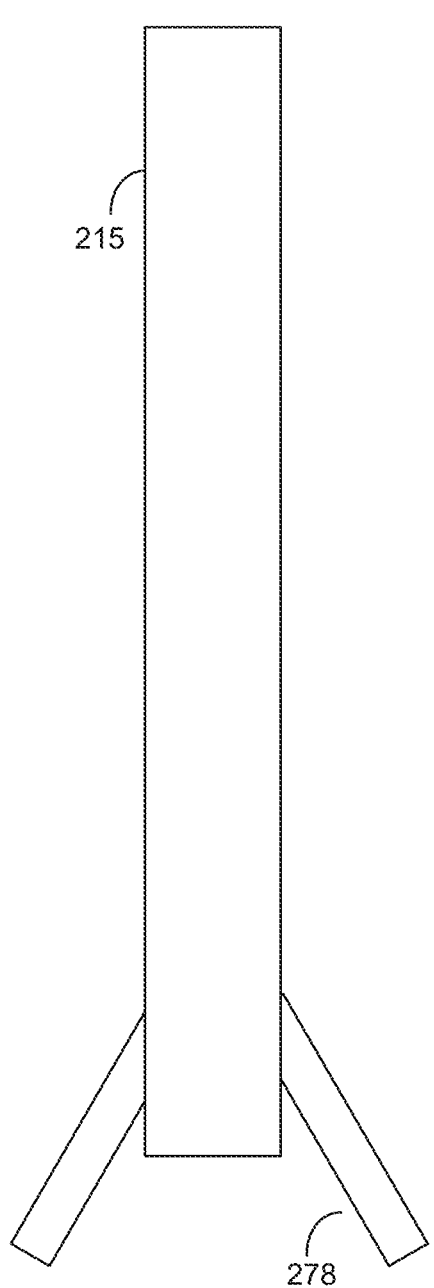
FIG. 2C illustrates anchor legs on the terminus of a geothermal reservoir pipe.
Figure 2D:
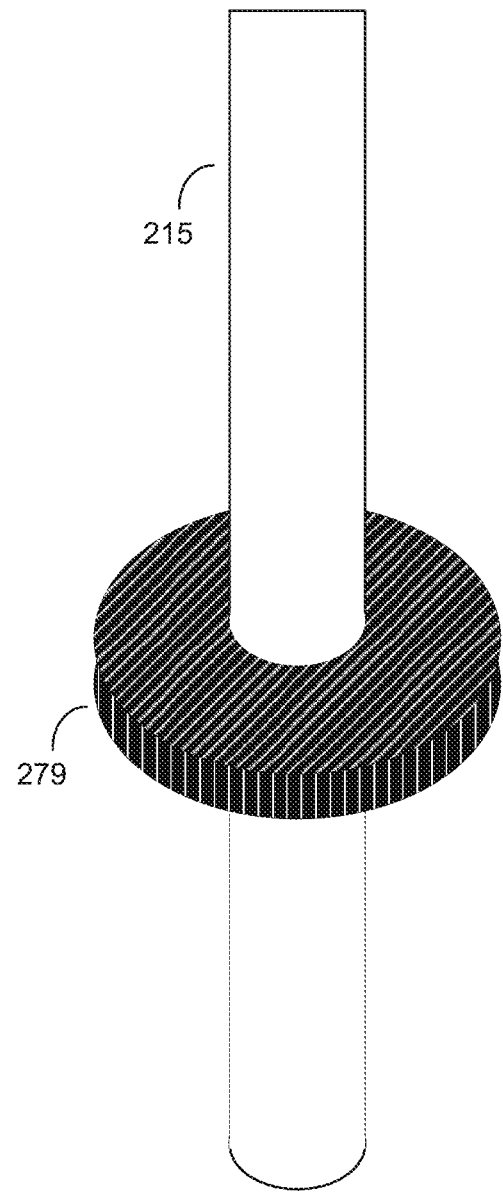
FIG. 2D illustrates an expandable collar at the terminus of a geothermal reservoir pipe.

As illustrated in FIG. 2B, the geothermal fluid return pipe 215 has short inner 215b and outer pipe sections 215a wherein the inner pipe section fits concentrically into the outer pipe section and seals the geothermal fluid in the geothermal fluid return pipe when in a closed position. The inner and outer pipes have a series of passages 272a-e, 274a-e at equal lengths along the geothermal fluid return pipe that may be rotated axially and offset to prohibit fluid transfer of the geothermal fluid out of the geothermal fluid return pipe. Rotation of the geothermal fluid supply pipe in the wellbore by application of an axial force at a head 270 of the geothermal fluid return pipe disposed outside of the well bore permits rotation of the geothermal fluid return pipe around its axis. As the geothermal fluid return pipe rotates (271), the outer pipe 215a slides over the inner pipe 215b until the passages on the outer pipe and inner pipe match thereby providing an exit path or passage for the geothermal fluid to pass from the geothermal fluid return pipe into the deep geothermal reservoir and then move to the geothermal fluid supply pipe. Each section of concentric inner and outer sections of the geothermal fluid return pipe include a locking or stop mechanism which prohibits rotation of the outer pipe section beyond a point where the fluid passages of the inner and outer sections match. The locking mechanism may include spring-loaded mechanisms 276a-e located within the inner pipe that catch one or more of the fluid passageways 272a-e in the outer pipe thereby securing the inner and outer pipes to one another and preventing rotation of the outer pipe around the inner pipe. Preferably rotation of the outer pipe relative to the inner pipe is limited to one quarter or one half turn, 90° or 180°, respectively, of axial rotation of the geothermal fluid return pipe. When desiring a closed position and restricted or stopped passage of geothermal fluid flow into the deep geothermal reservoir, an axial torsional force may be applied at the top end 270 of the geothermal fluid return pipe in an opposite direction of the force applied to rotate the outer section to a position aligning the passages of the outer and inner sections, thus misaligning the passages so there is no fluid flow. A second stop or locking mechanism, such as threads prohibits over rotation of the geothermal fluid return pipe thereby stopping rotation at a position where the passages of the inner and outer pipe sections no longer match thereby prohibiting passage of geothermal fluid out of the geothermal fluid return pipe into the deep geothermal reservoir. The sections of concentric inner and outer pipes are preferably 1-3 m in length, more preferably about 1 m in length. The geothermal fluid return pipe may contain a plurality of concentric passage sections, for example, 1-10 sections, preferably 2-8, 3-6, or 4-5 sections.

The shallow geothermal pipe 254 may have a similar mechanism at either end of the pipe to control the fluid flow. For example, when ambient air conditions are as low or lower than the temperature of the shallow geothermal reservoir, the condenser may be air cooled and the shallow geothermal well may be closed.

In order to permit axial rotation of the geothermal fluid return pipe in the wellbore located in the deep geothermal reservoir, the terminus of the geothermal fluid return pipe is preferably secure in the geological formation in which the deep geothermal reservoir is located. Preferably the terminus of the geothermal fluid return pipe is anchored to the bottom of the well bore and, in one embodiment, is cemented thereto. In other preferable embodiments, one or more expandable collars 279 or deployable anchor legs 278 are fitted concentrically around the exterior of the geothermal fluid return pipe at one or more locations downhole from one or more of the fluid passage sections, preferably downhole of all of the fluid passage sections.

The first embodiment further comprises a solar heat provisioning cycle including a solar collector 230 having a fluid manifold 237 with an inlet port and an outlet port, a thermal energy storage reservoir 234 fluidly connected at a first end to the outlet port, a second heat exchanger 238 having a third channel and a fourth channel, a second pump 236 connected between a second end of the thermal energy storage reservoir and the third channel, wherein the second channel of the first heat exchanger 232 is connected between the inlet port and the third channel of the second heat exchanger and wherein the second pump is configured to pump the first heat transfer fluid through the solar heat provisioning cycle.

The first embodiment additionally comprises a power generation cycle wherein the second heat exchanger 238 is configured to transfer heat from the first heat transfer fluid 231 in the third channel to a working fluid 241 in the fourth channel, thus vaporizing the working fluid, at least one turbine 240 having a turbine shaft connected to an electric power generator 242, the at least one turbine having an entry port and an exit port, wherein the entry port is fluidly connected to the fourth channel of the second heat exchanger 238. A first condenser 244 is included, having a first coil and a second coil, wherein the first coil is connected to the exit port, and a third pump 246 is fluidly connected between the first coil and the fourth channel, wherein the third pump is configured to pump the working fluid through the power generation cycle to turn the turbine shaft and to cause the electric power generator to generate electricity. The first condenser is configured to liquefy the vaporized working fluid by transferring heat from the first coil to the second coil.

There is a cooling cycle including a fourth pump 252 fluidly connected between the second coil and one of a shallow geothermal heat exchanger 214 and a vapor compression generator 362, wherein the fourth pump is configured to pump a second heat transfer fluid through the cooling cycle to cool the fluid in the second coil. A control system 201 is operatively connected to the pumps and the electric power generator.

The geothermal fluid 211 is water, steam or brine, the first heat transfer fluid 231 is one of partially hydrogenated polyphenyl hydrocarbon or water, the working fluid 241 is an organic phase change fluid selected from the group consisting of CGCs, HFCs, Hydrocarbons and supercritical-$CO_2$, and the second heat transfer fluid 251 is one of water, partially hydrogenated polyphenyl hydrocarbon and a lithium bromide/water mixture 363.

In the cooling cycle, the shallow geothermal heat exchanger 214 includes a low temperature shallow geothermal reservoir pipe 254 connected at a first end to the fourth pump 252 and at a second end to the second coil of the first condenser 244.

Alternatively, the cooling cycle comprises a vapor absorption cooling cycle 360 and a low temperature geothermal cooling cycle, the vapor absorption cooling cycle including a third heat exchanger 366 having a fifth and a sixth channel, wherein the fifth channel is connected to the vapor absorption cycle generator 362, an expansion valve 367 connected to the fifth channel, an evaporator 368 connected to the expansion valve, an absorber 369 connected to the evaporator and a fifth pump 354, a fourth heat exchanger 364 having a seventh and an eighth channel, wherein the seventh channel is connected between the fifth pump and the vapor absorption cycle generator 362, wherein the eighth channel is connected between the vapor absorption cycle generator and the absorber, wherein the fifth pump is configured to pump the Librium bromide/water mixture 363 through the vapor absorption cycle.

The remaining heat is cooled by a low temperature geothermal cooling cycle including a sixth pump 352 connected between the sixth channel of the third heat exchanger 366 and a low temperature shallow geothermal pipe 354, wherein the sixth pump is configured to pump at least one of water and therminol (351) through the low temperature geothermal cooling cycle.

The solar collector 230 is one of a flat plate solar collector, an evacuated tube solar collector and a parabolic trough collector.

The solar collector may be a parabolic trough collector where the parabolic troughs direct sunlight to the manifold to heat the heat transfer fluid in the manifold.

The thermal energy storage reservoir 234 may include a high temperature storage tank, a low temperature storage tank, a temperature sensor and a valve configured to switch the fluid flow between the high temperature storage tank and the low temperature tank when the temperature of the first heat transfer fluid is less than the temperature of the stored heat transfer fluid in the high temperature storage tank, wherein the second pump 236 is configured to pump the stored heat transfer fluid from the thermal energy storage reservoir through the solar heat provisioning cycle.

In an alternative, the thermal energy storage reservoir may be a stratified single reservoir where the fluid may be pumped from different levels.

The control system 201 includes a controller having circuitry and at least one processor having program instructions configured to actuate the pumps to regulate electrical production by the electric power generator.

The second embodiment is illustrated with respect to FIG. 4. The second embodiment describes a hybrid geothermal electrical power generation system for use with a high temperature deep geothermal reservoir, comprising a topping cycle 447 connected to a geothermal fluid supply pipe 417 fluidly connected to the deep geothermal reservoir 410, a geothermal fluid return pipe 415 fluidly connected to the deep geothermal reservoir, at least one steam turbine 441 having a steam turbine entry port, a steam turbine exit port and a steam turbine shaft connected to a first electric power generator 443, the steam turbine entry port connected to the geothermal fluid supply pipe, a first heat exchanger 432 having a first channel and a second channel, wherein the first channel is connected to the steam turbine exit port, a first pump 413 connected between the first channel and the geothermal fluid return pipe, the first pump configured to pump a geothermal fluid from the deep geothermal reservoir through the steam turbine, the first channel and into the geothermal fluid return pipe. In the second embodiment, the geothermal fluid is steam 411, wherein pumping the steam through the steam turbine turns the steam turbine shaft and causes the first electric power generator to generate electricity.

A bottoming cycle utilizes the heat from the steam after it has been used to turn the first turbine 411 and also serves to cool the steam back to water before returning it to the geothermal reservoir. The bottoming cycle includes wherein the first heat exchanger 432 is configured to transfer heat from the steam to a $CO_2$ working fluid 441 in the second channel, converting the $CO_2$ working fluid to supercritical $CO_2$ gas. At least one supercritical-$CO_2$ turbine 440 having a supercritical-$CO_2$ turbine shaft connected to a second electric power generator 442 is utilized, the at least one supercritical-$CO_2$ turbine having a supercritical-$CO_2$ turbine entry port and a supercritical-$CO_2$ turbine exit port, wherein the supercritical-$CO_2$ turbine entry port is fluidly connected to the second channel.

The bottoming cycle includes first condenser 444 having a first coil and a second coil, wherein the first coil is connected to the supercritical-$CO_2$ turbine exit port. A second pump 417 is fluidly connected between the first coil and the second channel, wherein the second pump is configured to pump $CO_2$ through the bottoming cycle to turn the supercritical-$CO_2$ turbine shaft and to cause the second electric power generator to generate electricity.

The first condenser 444 is configured to transfer heat from the supercritical-$CO_2$ gas in the first coil to a heat transfer fluid in the second coil, thus converting the $CO_2$ gas to $CO_2$ liquid.

The second embodiment further includes a low temperature geothermal cooling cycle including a third pump 452 fluidly connected between the second coil and a first end of a pipe 454 in the low temperature shallow geothermal heat exchanger 414. A second end of the pipe in the low temperature shallow geothermal heat exchanger is connected to the second coil, wherein the third pump 452 is configured to pump at least one of water and therminol through the low temperature geothermal cooling cycle, thus transferring heat to the low temperature geothermal reservoir, and a control system (not shown) operatively connected to the pumps and the electric power generators.

The control system includes a controller having circuitry and at least one processor having program instructions configured to actuate the pumps to regulate electrical production by the electric power generators.

The third embodiment is illustrated with respect to FIG. 5A, 5B and FIG. 6. The third embodiment describes a hybrid solar-geothermal electrical power generation system for use with a high temperature deep geothermal reservoir, comprising a geothermal heat provisioning cycle including a geothermal fluid supply pipe 517 fluidly connected to the deep geothermal reservoir, a geothermal fluid return pipe 515 fluidly connected to the deep geothermal reservoir, a solar collector 530 having a fluid manifold with an inlet port and an outlet port, wherein the inlet port is connected to the geothermal fluid supply pipe, wherein the solar collector is configured to increase the heat of a geothermal fluid 531.

A thermal energy storage reservoir 534 is fluidly connected between the outlet port and the geothermal fluid return pipe and a first pump 536 is connected to the outlet port. A first heat exchanger 538 in included, having a first channel and a second channel, wherein the first channel is fluidly connected between first pump and the geothermal fluid return pipe. The first heat exchanger is configured to transfer heat from the high temperature geothermal fluid in the first channel to water in the second channel, thus converting the water to steam and lowering the temperature of the geothermal fluid.

The third embodiment includes a topping cycle including at least one steam turbine 541 having a steam turbine entry port, a steam turbine exit port and a steam turbine shaft connected to a first electric power generator 543, the steam turbine entry port connected to the second channel. A second heat exchanger 532 is included, having a third channel and a fourth channel, wherein the third channel is connected to the steam turbine exit port. A second pump 546 is connected between the third channel and the second channel, the second pump configured to circulate the steam through the steam turbine, the third channel and the second channel, wherein pumping the steam through the steam turbine turns the steam turbine shaft and causes the first electric power generator to generate electricity.

The third embodiment further includes a bottoming cycle 549 comprising wherein the first heat exchanger 532 is configured to transfer heat from the steam in the third channel to a $CO_2$ working fluid in the fourth channel, converting the $CO_2$ working fluid to supercritical $CO_2$ gas.

At least one supercritical-$CO_2$ turbine 540 is included having a supercritical-$CO_2$ turbine shaft connected to one of a second electric power generator 542 and a vapor compressor 664, the at least one supercritical-$CO_2$ turbine having a supercritical-$CO_2$ turbine entry port and a supercritical-$CO_2$ turbine exit port, wherein the supercritical-$CO_2$ turbine entry port is fluidly connected to the fourth channel.

A first condenser 586 is included, having a first coil and a second coil, wherein the first coil is connected to the supercritical-$CO_2$ turbine exit port.

A third pump 585 is fluidly connected between the first coil and the fourth channel, wherein the third pump is configured to pump $CO_2$ through the bottoming cycle to turn the supercritical-$CO_2$ turbine shaft and to cause either the second electric power generator 542 to generate electricity or the vapor compression 664 to rotate.

The first condenser 586 is configured to transfer heat from the supercritical-$CO_2$ gas in the first coil to the second coil, thus converting the $CO_2$ gas to $CO_2$ liquid, wherein the second coil is air cooled.

A control system (not shown) is operatively connected to the pumps and the electric power generators.

The third embodiment further comprises (see FIG. 5B, FIG. 6) a first three way valve 522 having a first valve inlet connected to the geothermal fluid supply pipe 517, a second valve inlet connected to the outlet port of the solar collector 530 and a first valve outlet connected to the first pump 536. A second three way valve 524 has a third valve inlet connected to the first channel, a second outlet connected to the geothermal fluid return pipe 515, and a third valve outlet connected to the solar collector inlet port.

Opening the first and second valve inlet and the first valve outlet provides both high temperature geothermal fluid and solar heated geothermal fluid to the first channel, opening the first valve inlet, closing the second valve inlet and opening the first valve outlet provides solar heated geothermal fluid to the first channel, closing the first valve inlet, opening the second valve inlet and the first valve outlet provides both high temperature geothermal fluid and solar heated geothermal fluid to the first channel, opening the third valve inlet, opening the second valve outlet and closing the third valve outlet provides low temperature geothermal fluid and fluid from the thermal energy storage reservoir to drain into the geothermal fluid return pipe, opening the third valve inlet, closing the second valve outlet and opening the third valve outlet provides low temperature geothermal fluid and fluid from the thermal energy storage reservoir to the solar collector inlet port, and closing the third valve inlet provides fluid from the thermal storage reservoir to the first channel.

Alternatively, the third embodiment comprises a vapor compression cooling/heating cycle 662 (see FIG. 6) where the vapor compressor 664 has a vapor compressor inlet and a vapor compressor outlet. Further included are an evaporator/heater 668 having a first coil and a second coil, an expansion valve 666, a low temperature shallow geothermal heat exchanger pipe 654 having a first end and a second end, a four way valve 626 having a first tap operatively connected to the vapor compressor inlet, a second tap operatively connected to the vapor compressor outlet, a third tap operatively connected to the first coil of the evaporator/heater 668 and a fourth tap operatively connected to the second end of the low temperature geothermal heat exchanger pipe 654.

The cooling cycle comprises opening the first, second, third and fourth taps, pumping the refrigerant into the low temperature geothermal reservoir, opening the expansion valve and pumping the refrigerant into the first coil. The heating cycle comprises opening the third tap and the fourth tap, pumping the refrigerant through the first coil, opening the expansion valve and pumping the refrigerant through the low temperature geothermal reservoir and opening the first tap. Pumping heated refrigerant into the low temperature geothermal heat exchanger cools the refrigerant, wherein pumping cooled refrigerant into the low temperature geothermal heat exchanger heats the refrigerant.

The control system (not shown) is connected to each tap of the four way valve and the expansion valve and is configured to selectively open and close the taps and the expansion valve to provide one of cooling and heating.

The refrigerant is R-134A.

The solar collector is preferably a parabolic trough collector.

The control system (not shown, but substantially similar to control system 201 of FIG. 2) includes a controller having circuitry and at least one processor having program instructions configured to actuate the pumps to regulate electrical production by the electric power generators.

Figure 7:
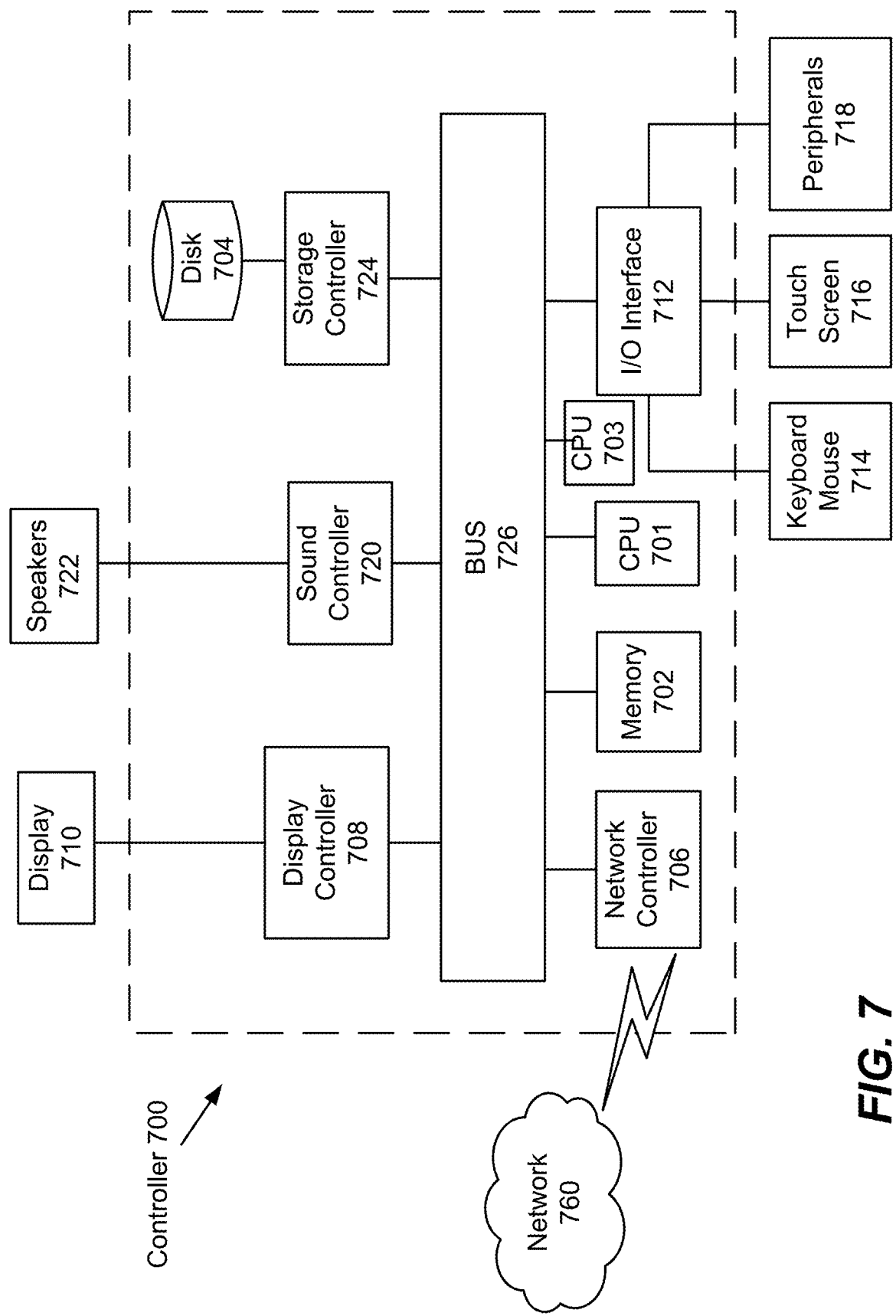
FIG. 7 is an illustration of a non-limiting example of details of computing hardware used in the computing system, according to certain embodiments.

Next, further details of the hardware description of the control system 201 environment of FIG. 2A-6 according to exemplary embodiments are described with reference to FIG. 7. In FIG. 7, the controller 700 is described is representative of the controller of control system 201 of FIG. 2. The controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 701, 703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry conFig.d to perform features described herein may be implemented in multiple circuit units (e.g., chips), or the features may be combined in circuitry on a single chipset, as shown on FIG. 8.

Figure 8:
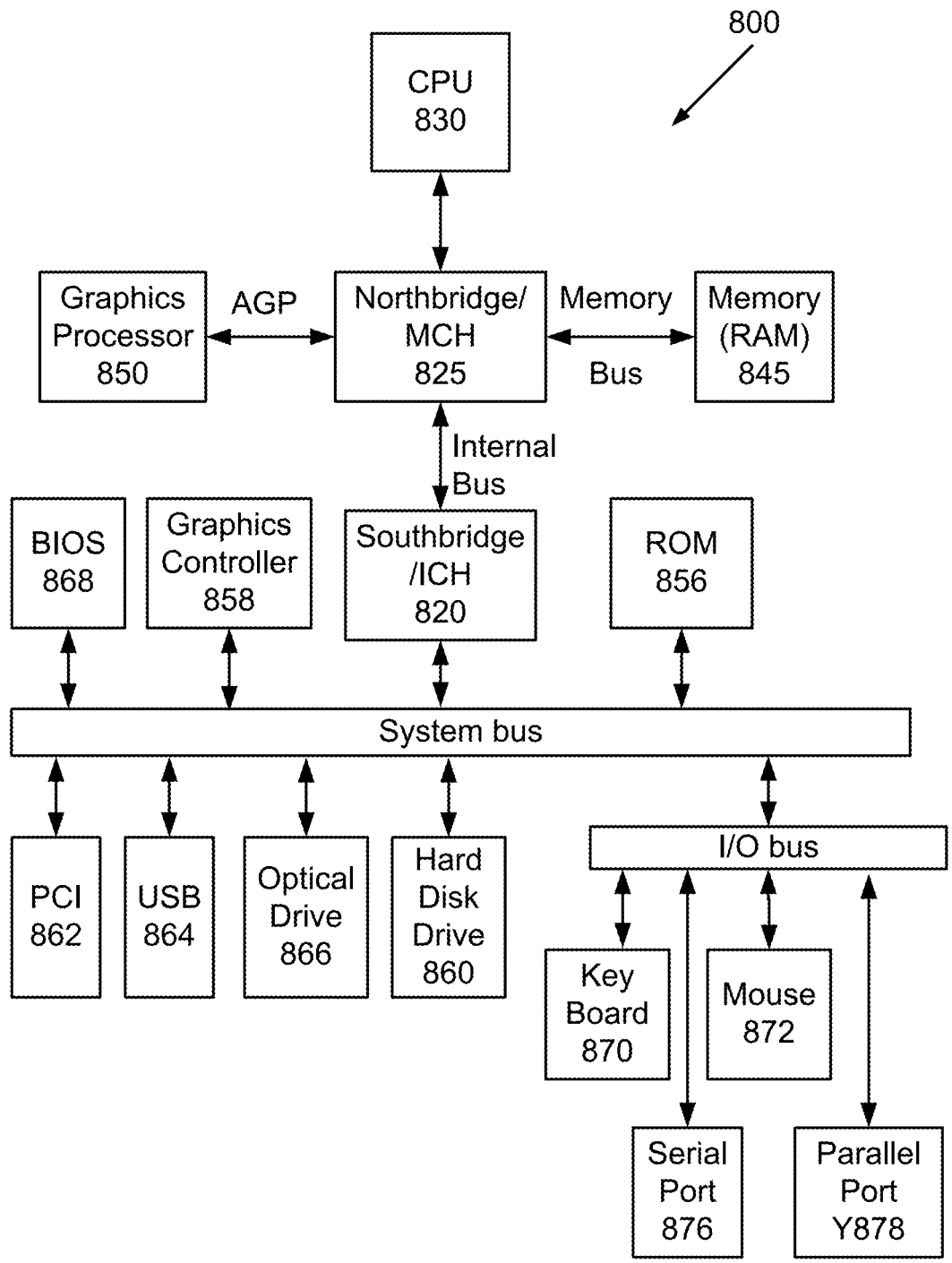
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
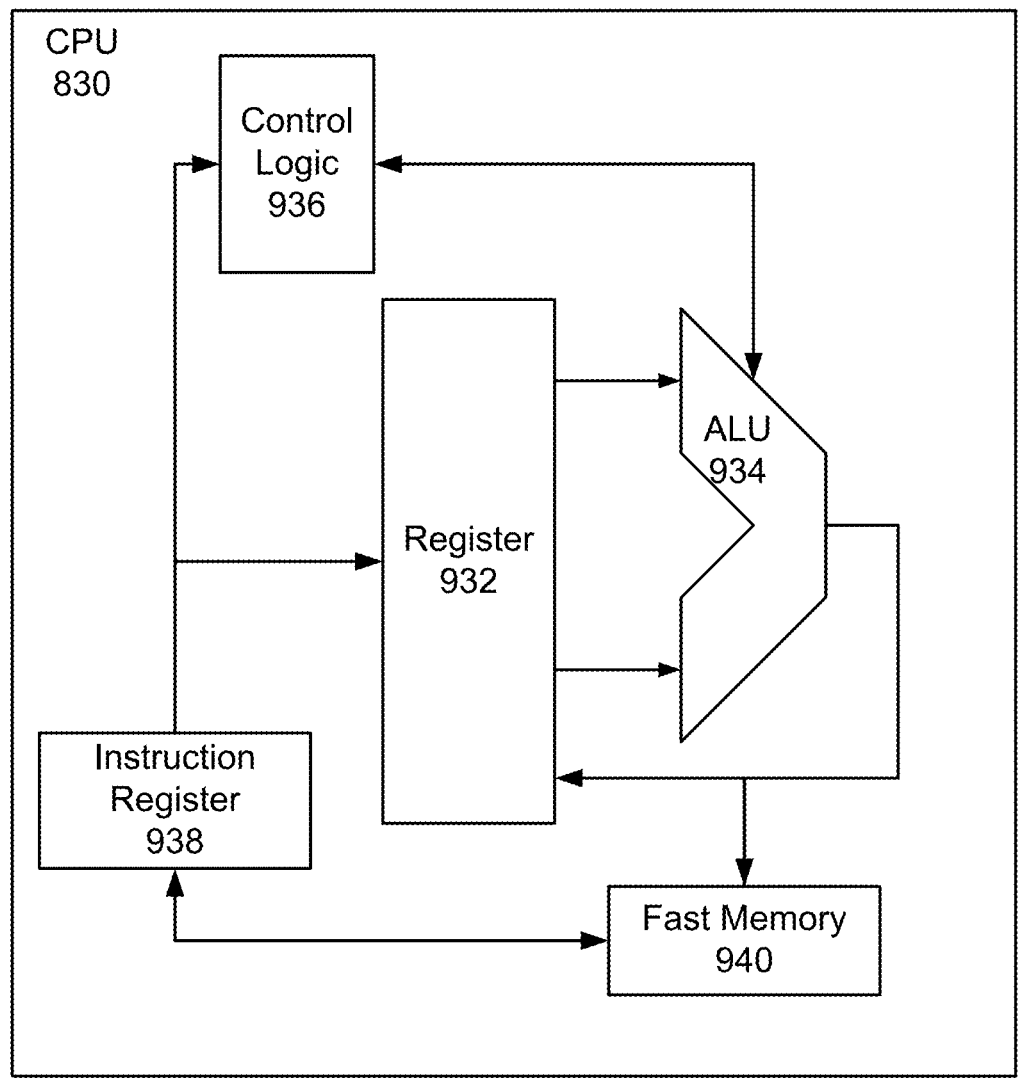
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
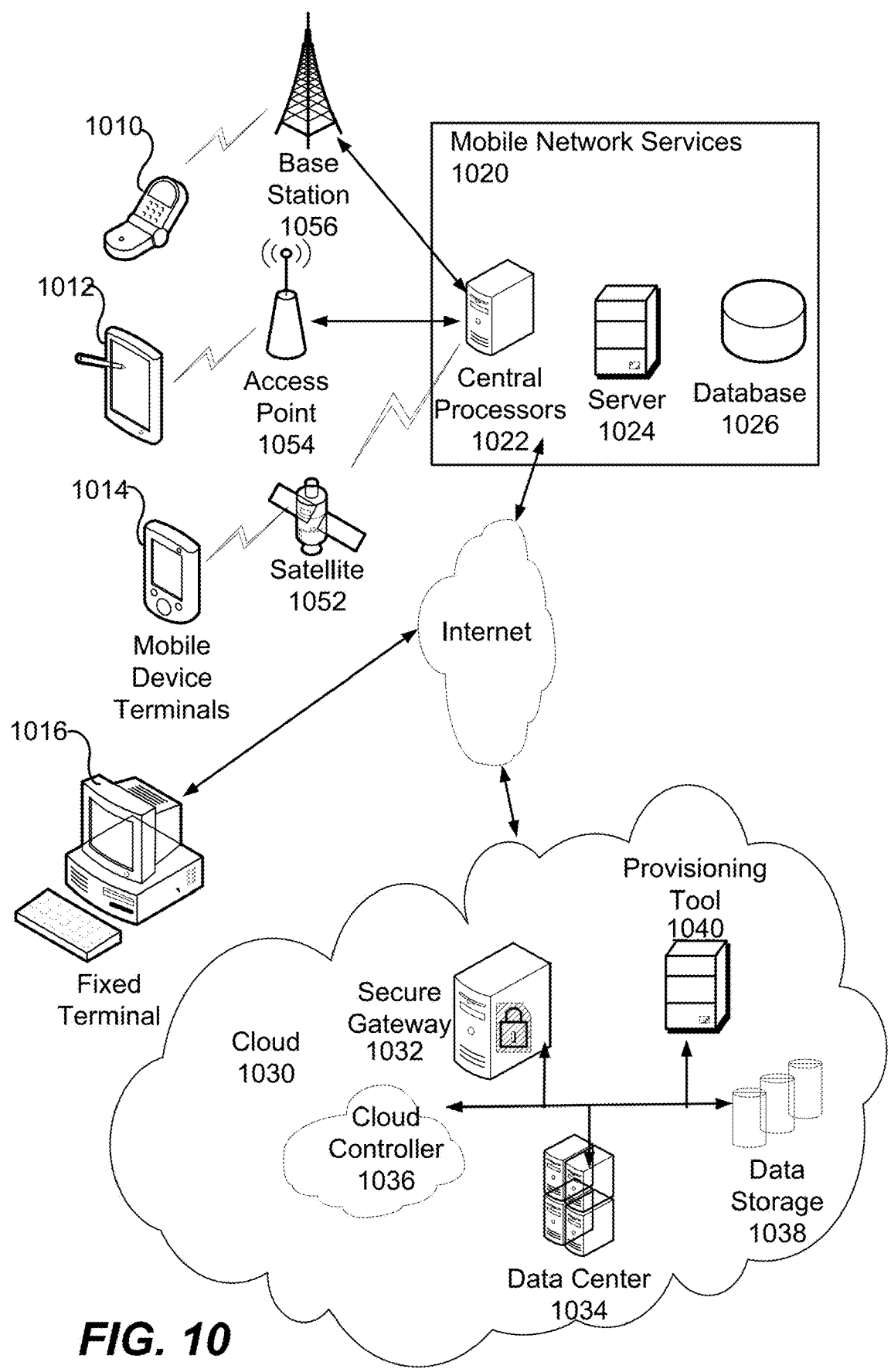
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein. The embodiments described provide virtually zero emission power production as well as heating/cooling which may be used during the day/night or summer/winter to regulate the temperature in a building or home.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A hybrid solar-geothermal electrical power generation system for use with a high temperature deep geothermal reservoir, comprising:
    a geothermal heat provisioning cycle including:
        a geothermal fluid supply pipe fluidly connected to the deep geothermal reservoir;
        a geothermal fluid return pipe fluidly connected to the deep geothermal reservoir;
        a first pump;
        a first heat exchanger having a first channel and a second channel, wherein the first channel is fluidly connected between the supply pipe and the first pump;
        wherein the first pump is configured to pump a geothermal fluid through the geothermal heat provisioning cycle;
        wherein the first heat exchanger is configured to transfer heat from the geothermal fluid in the first channel to a first heat transfer fluid in the second channel;

a solar heat provisioning cycle including:
   a solar collector having a fluid manifold with an inlet port and an outlet port;
   a thermal energy storage reservoir fluidly connected at a first end to the outlet port;
   a second heat exchanger having a third channel and a fourth channel, wherein the second heat exchanger is configured to transfer heat from the first heat transfer fluid in the third channel to a working fluid in the fourth channel, vaporizing the working fluid;
   a second pump connected between a second end of the thermal energy storage reservoir and the third channel;
   wherein the second channel of the first heat exchanger is connected between the inlet port and the third channel of the second heat exchanger;
   wherein the second pump is configured to pump the first heat transfer fluid through the solar heat provisioning cycle;
a power generation cycle including:
   at least one turbine having a turbine shaft connected to an electric power generator, the at least one turbine having an entry port and an exit port, wherein the entry port is fluidly connected to the fourth channel of the second heat exchanger;
   a first condenser having a first coil and a second coil, wherein the first coil is connected to the exit port;
a third pump fluidly connected between the first coil and the fourth channel,
   wherein the third pump is configured to pump the working fluid through the power generation cycle to turn the turbine shaft and to cause the electric power generator to generate electricity;
   wherein the first condenser is configured to liquefy the vaporized working fluid by transferring heat from the first coil to the second coil;
a cooling cycle including:
   a fourth pump fluidly connected between the second coil and one of a shallow geothermal heat exchanger and a vapor absorption cycle generator;
   wherein the fourth pump is configured to pump a second heat transfer fluid through the cooling cycle cool the fluid in the second coil;
a control system operatively connected to the pumps and the electric power generator,
wherein the geothermal fluid return pipe comprises:
   a plurality of outer pipe sections, each having a fluid entrance port, a series of concentric internal passages configured to allow fluid flow, the series of internal passages axially and concentrically offset from one another, the outer pipe section having an inner of diameter $D_o$;
   a plurality of inner pipe sections, each having an outer diameter $D_i$, where $D_o$ is greater than $D_i$, the inner pipe section having a series of concentric external passages configured to allow fluid flow, the series of internal passages axially and concentrically offset from one another; and
   a head end configured to rotate at least one outer pipe section;
   wherein rotation of an outer pipe section in a first direction aligns the series of internal passage of the outer pipe section with the series of external passages of the inner pipe section, allowing fluid flow from the outer pipe section to the inner pipe section, and wherein rotation an outer pipe section in a second direction misaligns the series of internal passage of the outer pipe section with the series of external passages of the inner pipe section, preventing fluid flow from the outer pipe section to the inner pipe section.

2. The hybrid solar-geothermal electrical power generation system of claim 1, wherein the geothermal fluid is water, steam or brine;
   wherein the first heat transfer fluid is one of partially hydrogenated polyphenyl hydrocarbon or water; and
   wherein the working fluid is an organic phase change fluid selected from the group consisting of chlorofluorocarbon, isopentane, isobutane, nbutane, and n-chlorobutane, hydrofluorocarbon, hydrocarbons and supercritical-$CO_2$; and
   wherein the second heat transfer fluid is one of water, partially hydrogenated polyphenyl hydrocarbons and a lithium bromide/water mixture.

3. The hybrid solar-geothermal electrical power generation system of claim 1, each internal passage of the plurality of inner pipe sections further comprising a spring loaded locking mechanism which lies flat when rotating an outer pipe section; wherein the spring loaded locking mechanism deploys to lock into a corresponding external passage of the outer pipe section when the passages align.

4. The hybrid solar-geothermal electrical power generation system of claim 1, wherein the series of concentric passages in each of the inner and outer pipe sections is 1-10 passages.

5. The hybrid solar-geothermal electrical power generation system of claim 1, wherein a terminal end of the geothermal fluid return pipe is connected within the deep geothermal reservoir by at least one of cementing the terminal end to a wall of the reservoir, attaching an expandable collar to the terminal end and deploying anchor legs at the terminus.

6. The hybrid solar-geothermal electrical power generation system of claim 1, wherein, in the cooling cycle, the shallow geothermal heat exchanger includes a low temperature shallow geothermal reservoir pipe connected at a first end to the fourth pump and at a second end to the second coil of the first condenser.

7. The hybrid solar-geothermal electrical power generation system of claim 1, wherein the cooling cycle further comprises a vapor absorption cooling cycle and a low temperature geothermal cooling cycle;
   the vapor absorption cooling cycle including:
      a third heat exchanger having a fifth and a sixth channel, wherein the fifth channel is connected to the vapor absorption cycle generator;
      an expansion valve connected to the fifth channel;
      an evaporator connected to the expansion valve;
      an absorber connected to the evaporator and a fifth pump;
      a fourth heat exchanger having a seventh and an eighth channel, wherein the seventh channel is connected between the fifth pump and the vapor compression generator;
      wherein the eighth channel is connected between the vapor absorption cycle generator and the absorber;
      wherein the fifth pump is configured to pump the Librium bromide/water mixture through the vapor absorption cycle;

the low temperature geothermal cooling cycle including:
  a sixth pump connected between the sixth channel of the third heat exchanger and a low temperature shallow geothermal pipe;
    wherein the sixth pump is configured to pump at least one of water and therminol through the low temperature geothermal cooling cycle.

8. The hybrid solar-geothermal electrical power generation system of claim 1, wherein the solar collector is one of a flat plate solar collector, a solar tower, a Fresnel based heater, an evacuated tube solar collector and a parabolic trough collector.

9. The hybrid solar-geothermal electrical power generation system of claim 1, wherein the solar collector is a parabolic trough collector, and the parabolic troughs direct sunlight to the manifold to heat the heat transfer fluid in the manifold.

10. The hybrid solar-geothermal electrical power generation system of claim 1, wherein the thermal energy storage reservoir comprises a high temperature storage tank, a low temperature storage tank, a temperature sensor and a valve configured to switch the fluid flow between the high temperature storage tank and the low temperature tank when the temperature of the first heat transfer fluid is less than the temperature of the stored heat transfer fluid in the high temperature storage tank;
  wherein the second pump is configured to pump the stored heat transfer fluid from the thermal energy storage reservoir through the solar heat provisioning cycle.

11. The hybrid solar-geothermal electrical power generation system of claim 1, wherein the control system includes a controller having circuitry and at least one processor having program instructions configured to actuate the pumps to regulate electrical production by the electric power generator.

12. A hybrid geothermal electrical power generation system for use with a high temperature deep geothermal reservoir, comprising:
  a topping cycle including:
    a geothermal fluid supply pipe fluidly connected to the deep geothermal reservoir;
    a geothermal fluid return pipe fluidly connected to the deep geothermal reservoir;
    at least one steam turbine having a steam turbine entry port, a steam turbine exit port and a steam turbine shaft connected to a first electric power generator, the steam turbine entry port connected to the geothermal fluid supply pipe;
    a first heat exchanger having a first channel and a second channel, wherein the first channel is connected to the steam turbine exit port;
    a first pump connected between the first channel and the geothermal fluid return pipe, the first pump configured to pump geothermal fluid from the deep geothermal reservoir through the steam turbine, the first channel and into the geothermal fluid return pipe;
    wherein the geothermal fluid is steam;
    wherein pumping the steam through the steam turbine turns the steam turbine shaft and causes the first electric power generator to generate electricity;
  a bottoming cycle including:
    wherein the first heat exchanger is configured to transfer heat from the steam to a $CO_2$ working fluid in the second channel, converting the $CO_2$ working fluid to supercritical $CO_2$ gas;
    at least one supercritical-$CO_2$ turbine having a supercritical-$CO_2$ turbine shaft connected to a second electric power generator, the at least one supercritical-$CO_2$ turbine having a supercritical-$CO_2$ turbine entry port and a supercritical-$CO_2$ turbine exit port, wherein the supercritical-$CO_2$ turbine entry port is fluidly connected to the second channel;
    a first condenser having a first coil and a second coil, wherein the first coil is connected to the supercritical-$CO_2$ turbine exit port;
    a second pump fluidly connected between the first coil and the second channel,
    wherein the second pump is configured to pump $CO_2$ through the bottoming cycle to turn the supercritical-$CO_2$ turbine shaft and to cause the second electric power generator to generate electricity;
    wherein the first condenser is configured to transfer heat from the supercritical-$CO_2$ gas in the first coil to a heat transfer fluid in the second coil, thus converting the $CO_2$ gas to $CO_2$ liquid;
  a low temperature geothermal cooling cycle including:
    a third pump fluidly connected between the second coil and a first end of a low temperature shallow geothermal heat exchanger;
    a second end of the low temperature shallow geothermal heat exchanger connected to the second coil;
    wherein the third pump is configured to pump at least one of water and therminol through the low temperature geothermal cooling cycle, thus transferring heat to the low temperature geothermal reservoir; and
  a control system operatively connected to the pumps and the electric power generators.

13. The hybrid solar-geothermal electrical power generation system of claim 12,
  wherein the control system includes a controller having circuitry and at least one processor having program instructions configured to actuate the pumps to regulate electrical production by the electric power generators.

14. A hybrid solar-geothermal electrical power generation system for use with a high temperature deep geothermal reservoir, comprising:
  a geothermal heat provisioning cycle including:
    a geothermal fluid supply pipe fluidly connected to the deep geothermal reservoir;
    a geothermal fluid return pipe fluidly connected to the deep geothermal reservoir;
    a solar collector having a fluid manifold with an inlet port and an outlet port,
  wherein the inlet port is connected to the geothermal fluid supply pipe;
    wherein the solar collector is configured to increase the heat of a geothermal fluid;
    a thermal energy storage reservoir fluidly connected between the outlet port and the geothermal fluid return pipe;
    a first pump connected to the outlet port;
    a first heat exchanger having a first channel and a second channel, wherein the first channel is fluidly connected between first pump and the geothermal fluid return pipe;
    wherein the first heat exchanger is configured to transfer heat from the high temperature geothermal fluid in the first channel to water in the second channel, thus converting the water to steam and lowering the temperature of the geothermal fluid;

a topping cycle including:
  at least one steam turbine having a steam turbine entry port, a steam turbine exit port and a steam turbine shaft connected to a first electric power generator, the steam turbine entry port connected to the second channel;
  a second heat exchanger having a third channel and a fourth channel, wherein the third channel is connected to the steam turbine exit port;
  a second pump connected between the third channel and the second channel, the second pump configured to circulate the steam through the steam turbine, the third channel and the second channel;
  wherein pumping the steam through the steam turbine turns the steam turbine shaft and causes the first electric power generator to generate electricity;
a bottoming cycle including:
  wherein the first heat exchanger is configured to transfer heat from the steam in the third channel to a $CO_2$ working fluid in the fourth channel, converting the $CO_2$ working fluid to supercritical $CO_2$ gas;
  at least one supercritical-$CO_2$ turbine having a supercritical-$CO_2$ turbine shaft connected to one of a second electric power generator and a vapor compressor, the at least one supercritical-$CO_2$ turbine having a supercritical-$CO_2$ turbine entry port and a supercritical-$CO_2$ turbine exit port, wherein the supercritical-$CO_2$ turbine entry port is fluidly connected to the fourth channel;
  a first condenser having a first coil and a second coil, wherein the first coil is connected to the supercritical-$CO_2$ turbine exit port;
  a third pump fluidly connected between the first coil and the fourth channel,
  wherein the third pump is configured to pump $CO_2$ through the bottoming cycle to turn the supercritical-$CO_2$ turbine shaft and to cause either the second electric power generator to generate electricity or the vapor compressor to rotate;
  wherein the first condenser is configured to transfer heat from the supercritical-$CO_2$ gas in the first coil to the second coil, thus converting the $CO_2$ gas to $CO_2$ liquid;
  wherein the second coil is air cooled; and
a control system operatively connected to the pumps and the electric power generators.

15. The hybrid solar-geothermal electrical power generation system of claim 14, further comprising:
  a first three way valve having a first valve inlet connected to the geothermal fluid supply pipe, a second valve inlet connected to the outlet port of the solar collector and a first valve outlet connected to the first pump;
  a second three way valve having a third valve inlet connected to the first channel, a second outlet connected to the geothermal fluid return pipe, and a third valve outlet connected to the solar collector inlet port;
  wherein the valves are configure such that opening the first valve inlet, the first valve outlet, the third valve inlet and the second valve outlet provides only high temperature geothermal fluid to the first channel;
  wherein opening the second valve inlet, the first valve outlet, the third valve inlet and the third valve outlet provides a solar heated fluid to the first channel; and
  wherein opening the first valve inlet, the second valve inlet, the first valve outlet, the third valve inlet, the second valve outlet, the third valve outlet provides a heated fluid to the first channel, from both the geothermal reservoir and the solar collector.

16. The hybrid solar-geothermal electrical power generation system of claim 14, further comprising a vapor compression cooling/heating cycle including:
  a vapor compressor inlet and a vapor compressor outlet;
  an evaporator/heater having a first coil and a second coil;
  a bi-directional thermostatic expansion valve;
  a low temperature shallow geothermal heat exchanger pipe having a first end and a second end;
  a four way valve having a first tap operatively connected to the vapor compressor inlet, a second tap operatively connected to the vapor compressor outlet, a third tap operatively connected to the first coil of the evaporator/heater and a fourth tap operatively connected to the second end of the low temperature geothermal heat exchanger pipe;
  wherein the cooling cycle comprises opening the first, second, third and fourth taps, pumping the refrigerant into the low temperature geothermal reservoir, opening the bi-directional thermostatic expansion valve and pumping the refrigerant into the first coil, wherein the system is configured such that the refrigerant passes through the first tap into the vapor compressor inlet and exits through the vapor compressor outlet to the second tap of the four way valve and exits through the fourth tap of the valve into the second end of the low temperature geothermal heat exchanger pipe, the cooled fluid from the first end of the low temperature geothermal heat exchanger pipe then passes through the bi-directional thermostatic expansion valve into the first coil of the evaporator/heater;
  wherein the heating cycle comprises opening the opening the first, second, third and fourth taps, pumping the refrigerant through the first coil, opening the bi-directional thermostatic expansion valve and pumping the refrigerant through the low temperature geothermal reservoir and opening the first tap, wherein the system is configured such that the refrigerant from the outlet of the vapor compressor goes to the second tap of the four way valve and exits through the third tap of the four way valve into the first coil of the evaporator/heater where the fluid is cooled, losing heat in the process, the fluid then passes though the bi-directional thermostatic expansion valve into the first end of the low temperature geothermal heat exchanger pipe to absorb heat and exits through the second end of the low temperature geothermal heat exchanger pipe and into the fourth tap of the four way valve, and proceeds to exit through first tap of the four way valve into the inlet of the vapor condenser;
  wherein pumping heated refrigerant into the low temperature geothermal heat exchanger cools the refrigerant;
  wherein pumping cooled refrigerant into the low temperature geothermal heat exchanger heats the refrigerant;
  wherein the control system is connected to each tap of the four way valve and the expansion valve and is configured to selectively open and close the taps and the expansion valve to provide one of cooling and heating.

17. The hybrid solar-geothermal electrical power generation system of claim 16, wherein the refrigerant is 1,1,1,2-Tetrafluoroethane.

18. The hybrid solar-geothermal electrical power generation system of claim 17, wherein the control system includes a controller having circuitry and at least one processor having program instructions configured to actuate the pumps and the valves to regulate electrical production by the electric power generators.

19. The hybrid solar-geothermal electrical power generation system of claim 14, wherein the solar collector is one of a flat plate solar collector, a solar tower, a Fresnel based heater, an evacuated tube solar collector and a parabolic trough collector.

\* \* \* \* \*